United States Patent [19]

Collins et al.

[11] 4,061,880
[45] Dec. 6, 1977

[54] TIME-MULTIPLEX PROGRAMMABLE SWITCHING APPARATUS

[75] Inventors: Galen R. Collins, Novato, Calif.; George A. May, Surrey, Canada; Indra Lee Gendo, Novato, Calif.

[73] Assignee: Dicom Systems, Ltd., Vancouver, Canada

[21] Appl. No.: 560,981

[22] Filed: Mar. 21, 1975

[51] Int. Cl.$^2$ .............................................. H04J 6/00
[52] U.S. Cl. .............................................. 179/15 BA
[58] Field of Search .......... 179/15 AT, 15 A, 15 AL, 179/18 AD, 99, 15 BA

[56] References Cited

U.S. PATENT DOCUMENTS

| | | | |
|---|---|---|---|
| 3,522,380 | 7/1970 | Kneisel et al. | 179/15 BA |
| 3,627,951 | 12/1971 | Batin | 179/15 BA |
| 3,781,478 | 12/1973 | Blahut et al. | 179/15 AL |
| 3,787,631 | 1/1974 | Lewis | 179/15 AT |
| 3,828,136 | 8/1974 | Perna et al. | 179/15 BF |
| 3,851,104 | 11/1974 | Willard et al. | 179/15 BY |
| 3,860,761 | 1/1975 | O'Neill, Jr. | 179/18 J |
| 3,885,106 | 5/1975 | Deutsch | 179/18 J |

*Primary Examiner*—Thomas W. Brown
*Attorney, Agent, or Firm*—Limbach, Limbach & Sutton

[57] ABSTRACT

Time-multiplex programmable switching apparatus for establishing on demand time shared connections between pairs of ports. Signals within the system are digital. The invention is described in the context of an electronic private automatic branch exchange (EPABX) telephone system. A central processor unit (CPU) including a recirculating memory carries port address pairs and digital information to be exchanged along with a status word used for identifying program loops. Program steps are sequenced or initiated by timing signals and signaling data from the port units. Common buses interconnect the port units with the central processor unit. Port units are grouped with a common buffer memory for converting parallel data from the CPU to serial form. The CPU memory includes slots for housekeeping functions to detect, inter alia, an off-hook telephone. The principles of the invention are applicable to telephone central offices and digital switching systems as for computers, for example. Individual EPAX's may be interconnected for expanded service.

16 Claims, 11 Drawing Figures

TIME-MULTIPLEX PROGRAMMABLE SWITCHING APPARATUS

BACKGROUND OF THE INVENTION

The present invention relates to switching systems and more particularly to an electronic switching system for digital information. Such a system may be embodied in an electronic private automatic branch exchange (EPABX) of a telephone system, for example.

A telephone private branch exchange (PBX) is usually located on the premises of a telephone system customer to provide for switching calls between any two extensions served by the PBX or between any extension and the outside telephone system via a trunk to the telephone central office.

Historically, the small business PBX telephone requirements were served by a manually operated cord-and-jack switchboard. Such equipment was bulky and unsightly and required the undivided attention of the operator. The cord-type manual PBX has jacks, each with an associated lamp and designation, for each extension and central office trunk. Cord circuits terminated in pairs of flexible cords tipped with plugs are used to connect the jacks to establish the desired connections. The attendant has a telephone and dial circuit which can be connected to any cord circuit by operation of appropriate keys.

An improvement on the basic cord-and-jack manual PBX is the cordless manual PBX in which the operator uses keys to operate relays, which perform the actual switching function. In the cordless manual PBX, the switching equipment is located remote from the operator console, thus providing a more pleasing appearance.

A further improvement over the manual PBX is the automatic PBX, or referred to as a "PABX" or dial PBX, in which each extension is equipped with a dial so that the party may set up his own call without intervention of the operator. Early types of the PABX employed electromechanical switching similar to that used in central offices: step-by-step switching and crossbar switching. Such switching systems required substantial space, soundproofing, and special power plants.

The third-generation in PBX design is the electronic PABX (EPABX) in which the switching is processed electronically. Prior art electronic PABX systems fall generally into several categories: space-division switching, time-division switching, and hybrid space-division/time division switching. Such systems may further be categorized as analog and digital according to the condition of the information as it passes through the switching system. A typical characteristic of the electronic PABX is common control circuitry of some type.

In the space-division type of EPABX a switching network of cross points is controlled by a central control logic. The crosspoints are typically reed switches or solid-state devices. A close analog to electromechanical crossbar switching is apparent. A two way communication path in real time is provided in the conventional way.

In a variation of the space-division EPABX, one prior art system employs time-division multiplexing and demultiplexing at the inputs and outputs of a space-division network to provide a hybrid space-division/time-division system.

Prior art time-division EPABX systems provide a time-division multiplex "highway" or bus common to all lines and trunks. The highway passes analog information on a time-division basis using sampling techniques. A central control establishes time slots in which particular lines or trunks are gated to provide connections via the common bus. One such system having analog sampling is described in "Economical Electronic Switching for the Small Business User" by Tony Stansby in *Telesis*, Vol. 2, No. 3, Winter 1971.

Modification of the analog time-division multiplex system of the aforementioned *Telesis* article are disclosed in U.S. Pat. 3,652,800 issued Mar. 28, 1972 to Gerald F. Dooley and U.S. Pat. No. 3,806,654 issued Apr. 23, 1974 to Gerald F. Dooley et al. The basic analog time-division switching matrix is made to accommodate digital signals by controlling the sample rate and bandwidth of the digital signals. As in the *Telesis* article, the switching arrangement or matrix is external to the central control means. That is, the central control is a separate adjunct to the information transmission path.

Another type of time-division multiplexing which is used in communications should be noted. In telephone carrier systems and microwave links, dedicated ports are connected in a time-shared manner. Port $A_n$ always talks to port $B_n$ and so on. Such as approach is obviously not applicable to a telephone switching system in which flexibility is essential.

It will be apparent that electronic switching systems have departed conceptually in large degree from conventional electromechanical switching systems. Space-division systems while providing certain advantages retain many of the disadvantages of the earlier electromechanical cross point systems such as the need to test multiple paths and the occurrence of path blocking long before the network is fully loaded. A large space division system is also subject to crosstalk depending on the quality of the switch and time complexity of the possible interconnections.

Time-division switching can overcome such shortcomings inherent in cross point switching. For example, by assigning a time slot only when service is acquired, the system can be "filled to the top." That is, blocking does not occur until every time slot is in use.

Prior art time-division switching systems have heretofore been limited in the number of possible lines. For example, the pulse amplitude modulating (PAM) bus of the system of the *Telesis* article is inherently limited to a relatively small number of direct interconnections. Further secondary switching of this type, while providing more interconnections, introduces further signal distortion and increases system complexity. Moreover, such as system becomes further restricted when multiple slots are required for handling digital signals. Analog cross-talk between time slots remains a problem. The number of time slots are limited by the need to transmit sufficient analog information while still not showing interaction between different samples.

The advantages of time-division switching can best be utilized in a system designed from the "ground-up" to handle digital information. Such a system provides the flexibility of handling not only analog-to-digitally converted voice information but also direct digital information as, for example, between a time shared computer and a remote terminal. Also, such a digital system simplifies connection with the standard U.S. telephone T1 trunk which is in digital format.

SUMMARY OF THE INVENTION

In accordance with the teachings of the present invention, a time-division electronic switching system is provided in which the switched signals are in digital format. Switching is accomplished by processing of the digital signals within the recirculating memory of a central processing unit rather than in a matrix or other switching highway arrangement external to a control unit: the digital data is integrated into the central processing unit in the present invention.

The basic system includes a central processor unit (CPU), including a program circuit unit, and a plurality of port units connected to the CPU by common buses. The CPU includes a recirculating programmable memory, and a source of clocking signals. The program circuit unit includes micro-program memory circuits and tone generators. Each port unit includes one or more port circuits and a single common circuit having a buffer memory.

Port units are of several types including station line units, which have a plurality of line circuits for connection to telephone handsets; trunk line units, which have a plurality of trunk circuits for connection to trunk circuits; attendant line units for connection to the attendant (operator) consoles, tone decoder units; and a flexible conference unit for connection to conference ports.

There are two levels of multiplexing: between each port circuit and the port unit buffer memory and between the port unit buffer memories and the CPU.

Under the control of the CPU timing circuits in sequence one port circuit at a time in each port unit simultaneously exchanges a digital bit with the port unit buffer memory until a cycle is completed whereby each port unit has exchanged information with the buffer memory. This occurs whether or not the port circuit is active. This constitutes the first of two levels of multiplexing within the overall system.

As necessary, a port circuit includes a codec (coder/decoder) for analog/digital and digital/analog conversion to communicate with an analog line or trunk. A preferred form of analog-to-digital conversion is companded delta modulation, however, the invention is not limited thereto. Such a preferred companded delta modulation apparatus is disclosed in the copending application of K. Fredrik Nordling, filed Apr. 8, 1974, Ser. No. 458,806, now U.S. Pat. No. 3,922,606, issued Nov. 25, 1975, which is incorporated herein in its entirety by reference.

The CPU memory includes a plurality of slots. Periodically, the CPU addresses every port circuit and the condition of that port circuit (off-hook or request for service in the case of line circuit) causes the program circuits to take certain predetermined actions: for example, the setting up of a call between two line circuits. The memory then carries the caller line circuit address and the called line circuit address in a slot along with the status word to control the program circuits which cause the system to maintain the connection until the caller or called party goes on-hook. Each active slot includes a caller word, a called word and a status word. Generally, the caller and called words include the addresses of the caller and called port circuits, the voice and signaling information and its class of service if the port circuit is active; and the status word which controls the program circuits of the program unit. Whenever the particular slot comes up in the recirculating memory, the caller line circuit and the called line circuit are addressed one after the other and digital information stored in the port circuit buffer memories and information stored in the CPU memory slot are exchanged. During successive slots, the caller and called digital information is swapped and is sent back to the port circuit buffer memories for transmission to the two line circuits. Thus digital information is exchanged in both directions between the line circuits. The exchange of information through the CPU memory constitutes the second level of multiplexing in the overall system. The timing of the data exchanges are arranged to correlate with the port circuit's digital bit rates.

Connections between the CPU and the port units are via common buses. No separate buses, highways or matrices are provided for exchange of digital information. As will be understood better when the detailed description of the invention is read, the transmission of information through the system is via the CPU where the information as well as port circuit addresses and signaling information is handled.

Certain CPU memory slots are dedicated to housekeeping, scanning and searching functions ("RWR" slots) and others to information exchange ("talk" slots). For example, a particular port circuit is interrogated to determine its signaling state. Each port circuit in the system, sequentially is interrogated one at a time by the CPU. If an off-hook condition is found, for example, that caller address and status word is inserted subsequently into a "talk" slot where the program circuits can act on it every time that talk slot is processed. That is, a port circuit found to require attention by an RWR slot is transferred to a "talk" slot where it is subsequently processed as necessary whenever the "talk" slot comes up in the recirculating memory. The RWR slot is then free to continue its interrogation of other port circuits.

Other RWR slots interrogate port circuits as to their class of service. The system may be seeking a Touch Tone decoder circuit, for example, in order to process a Touch Tone caller.

The RWR slots are dedicated, whereas, the talk slots are filled only on demand. Thus, the system can be "filled to the top".

Every memory slot that is filled contains a status word which controls the program circuit unit. In effect, the status word is a scratch pad which includes a program-step address that causes the program circuits to issue instructions in accordance with the program addressed. The status word can cause the memory to be updated including an update of the status word itself so as to proceed to another program step when the slot comes up again. In effect there are as many separate simultaneous programs running as there are memory slots. That is, the system can be viewed as a large number of separate computers (one for each slot) but with time shared hardware.

Although the preferred embodiment describes a system in which not only communication information is exchanged repetitively but also housekeeping, scanning and searching functions are handled repetitively, it is necessary only that the communications information be exchanged repetitively. The housekeeping, scanning and searching functions can be handled on a random access basis.

The EPABX according to the present invention requires a minimum of attendant involvement. All features normally needed to establish a call are station controlled, reducing attendant duties to answering and extending incoming calls, dialing out for restricted phones and general assistance. Great flexibility is provided by the program circuits which can be programmed to provide various station controlled features as desired including call hold, transfer, consulations, camp on, dial call pick-up, group hunt, automatic callback, call forwarding (all calls, busy line or no answer), paging access, directed call pick-up, conference and executive override. Each station's status of service code determines which of any of the features are available to it.

Although the preferred embodiment will be described in the context of an electronic PABX having analog sources, it will be understood that the invention is also applicable to the switching of digital sources by the same equipment. Further several switching systems can be interconnected via intra-links to handle a large number of stations by providing a linking system having a third level of multiplexing. Also, the invention is applicable to switching systems such as telephone central offices. Moreover, the system can be split into digitally interconnected but geographically spaced subassemblies.

DETAILED DESCRIPTION OF THE PREFERRED EMBODIMENT

I. OVERALL SYSTEM

Figure 1:
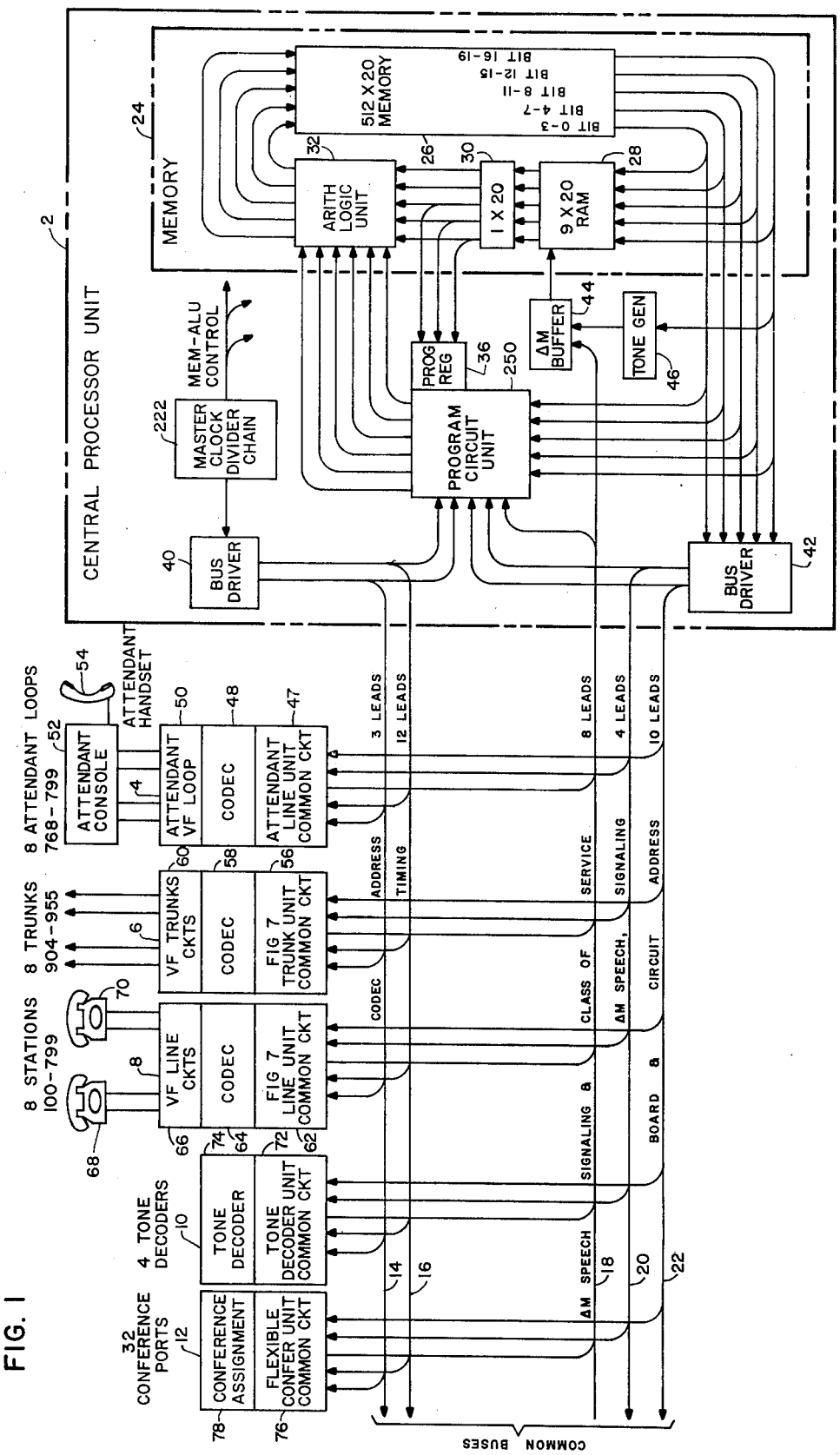
FIG. 1 is a block diagram showing an electronic private automatic branch exchange telephone system according to the present invention.

Referring now to the drawings and particularly to FIG. 1 wherein a functional system block diagram of an electronic PABX according to the present invention is shown. The system includes a central processor unit (CPU) 2, a plurality of port units 4, 6, 8, 10 and 12 and a plurality of common buses 14, 16, 18, 20 and 22 interconnecting the port units and the CCU.

The CPU 2 is generally divided into three functions: memory, program and timing. The memory portion 24 comprises a recirculating memory loop including 20 bit wide shift register 26, 20 bit wide random access memory (RAM) 28, 20 bit wide operational register 30 and an arithmetic logic unit (ALU) 32 for altering any portion of the recirculating 20 bit words. The recirculating memories thus comprise 512, 9 and 1 word capacity, respectively, the memory is broken into three sections to facilitate the transfer of information and to account for system delays as will be explained further below. The 522 word total memory capacity provides 174 slots of three words each; the words comprising the caller (CR), called (CD) and status (SW) words. Twenty-four slots (RWR slots) are dedicated to housekeeping, scanning and searching functions and the remaining 150 slots (talk slots) are available for conversations, call forwarding, automatic callback instructions, attendant assistance, conference port and tone decoder allocation.

The recirculating memory loop can comprise random access memories in which date is "recirculated" in place of or in addition to the shift registers described in this preferred embodiment. It will therefore be understood that "recirculating memory" is to be construed broadly and is not limited to the use of shift registers. Further, the preferred embodiment can be modified to provide cyclical or repetitive handling of information but random access handling of housekeeping, scanning and searching functions.

As the data recirculates in the memory, the status word (SW) is processed first, then the caller word (CR) and finally the called word (CD) before continuing to the next memory slot. The status word is applied to the program circuits 250, where any changes required are evaluated in order to update the memory data as it passes through the ALU 32. If there has been no change, the output of the logic unit 32 is identical to the input from the operational register 30.

The processing of each conversation slot or talk slot is under the direction of a program contained in the program circuit unit 250. This proram is a network of read only memories (ROM'S) and gates which does not have a particular timing sequence but which responds to each new set of inputs as they appear from the memory 24. The program sequence takes place as the caller (CR) and called (CD) words are processed and their respective circuits are addressed via the common buses 18, 20, and 22, to transmit and receive the voice and signaling data. The signaling information is monitored by the current program which is addressed by the status word (SW) in the memory and mode timing to see whether a change in status is required. Further details on these functions are provided below.

The program register 36 is used for transferring information from one slot of memory 24 to another. For example, when a slow scan slot (RWR slot) discovers that a particular port circuit requires attention it is transferred to a talk slot for further processing. Other functions of the program register will be described below.

The CPU 2 also includes a master clock and divider chain 222 for providing timing signals to the memory 24 and to the common buses 14 and 16 via bus driver 40. The program circuit unit 250 also receives the timing signals on buses 14 and 16.

The output of memory 24 is further applied to a bus driver 42 for application to common buses 20 and 22 and to the program circuit unit 250. A delta modulation buffer 44 receives delta modulated speech and signaling information on common bus 18 for application to register 28. The signaling and class of service information form on bus 18 is applied to program circuit units 250. A tone generator 46 generates digital signals representing tones in response to the register 26 output for application to the delta modulation buffer 44. These functions will be described further in detail below.

A typical system will include a plurality of port units 4, 6, 8, 10 and 12. Port unit 4 is an attendant line unit, which includes an attendant line unit common circuit 47, a codec 48 for voice frequency to delta modulation and for delta modulation to voice frequency conversion and attendant voice frequency loops 50 for 8 attendant loops connected to the attendant console 52. The attendant is provided with a handset 54 or an optional headset.

Port unit 6 is a trunk unit which includes a trunk unit common circuit 56, a codec 58 for voice frequency to delta modulation and for delta modulation to voice frequency conversion and voice frequency trunk circuits 60 for connection to 8 outgoing trunks to the telephone central office. The central office sees a normal voice frequency (VF) loop. In the case of digital format trunks, such as T1 trunks, the codec 58 is omitted and, if needed, an appropriate digital to digital interface is provided.

Port unit 8 is a station line unit (SLU) including a station unit common circuit 62, a codec 64 for voice frequency to delta modulation and for delta modulation to voice frequency conversion and voice frequency line circuits 66 for connection to 8 standard telephone stations of which two, 68 and 70, are shown.

An arbitrary 3 digit numbering system may be used, for example, 768–799 for attendant loops; 904–995 for trunks; and 100–799 for telephone stations.

Port unit 10 is a tone decoder unit including a tone decoder unit common circuit 72 and a tone decoder circuit 74. The unit may include, for example, four tone decoders. When properly addressed by the CPU 2, the tone decoder unit converts multi-frequency tone signaling to numbers in binary notation. Although the system may be programmed to process make and break dialing pulses and to accept multi-frequency tone pulses, it can also be programmed to convert tone signaling to dial pulses for make and break telephone-exchanges.

The flexible conference unit 12 includes a flexible conference unit common circuit 76 and conference assignment circuits 78. The circuits may include, for example, the ability to set up 16 or 32 conference ports. Inasmuch as the information circulating within the system is in digital form, it is not possible to directly set up a conference call since the information mix must be summed to form a conference. Thus, the conference unit 12 functions to convert the digital information from each of the several stations participating in a conference call into an appropriate format, where it may be summed together to provide the conference, and new (conference) delta information generated for transmission to the parties in the conference.

Further details on a typical port unit are given below in the detailed description of a station line unit.

It will be noted that each of the port units is connected to the common buses 14, 16, 18, 20 and 22. Bus 14 is driven from the master clock and divider chain 222 and provides for the sequential addressing of each of the port circuits within each port unit in order to provide for an exchange of information between each port unit common circuit and each particular port unit circuit as is further described below. Each port unit also receives clock timing signals from the master clock and divider chain 222.

Delta modulated speech, signaling and class of service information as to each port circuit is multiplexed onto bus 18 for application to the central processing unit. Delta modulated speech and signaling information from the central processing unit is provided on a multiplex basis to the port circuits via bus 20. Bus 22 addresses a particular port circuit so as to effect the interchange of information on buses 18 and 20.

The general functions of the overall system having been described in connection with FIG. 1, the details of the system will now be described in connection with the remaining figures.

II. STATION LINE UNIT

Turning now to the station line unit portion of the overall system, which is shown in FIGS. 2, 3, 4 and 5, each station line unit 8 includes eight line circuits for connection to standard telephone sets via a two-wire loop. The station line unit includes three sections, performing three separate functions. The first is a line circuit 66 which accepts the inputs from the telephone sets and provides talk battery for the loop. It also contains a ringing relay, two to four-wire hybrid, amplification and spurious signal protection circuits.

The second part of the circuit is an encoding/decoding circuit (codec) 64 which accepts the voice frequency signal from the station loop and feeds this sampled information into a random access memory. This circuit also receives digitized speech from the other part of the conversation and converts it to voice frequency for the station on that loop. The encoder/decoder circuit also recognizes signaling on the loop and encodes this into digital form and decodes the outgoing signal to the voice frequency loop.

The third part of the station line unit contains the common circuit 62 with a 64 bit random access memory which serves all eight line circuits in the station line unit. It provides an interface between encoding/decoding circuits and the common buses to the central processing unit 2. This random access memory stores the digital information of the voice frequency path both going to the decoding circuit for the station and the encoded information from the voice frequency loop. It retains the information until the particular line circuit is addressed, which addressing process enables the common circuit allowing the three least significant digits to address the part of the random access memory dedicated to the particular line circuit. The information from the line circuit is encoded serially and it must be converted into parallel format to be routed to the central processing unit. This is done with a latch and a series of routing gates.

Figure 2:
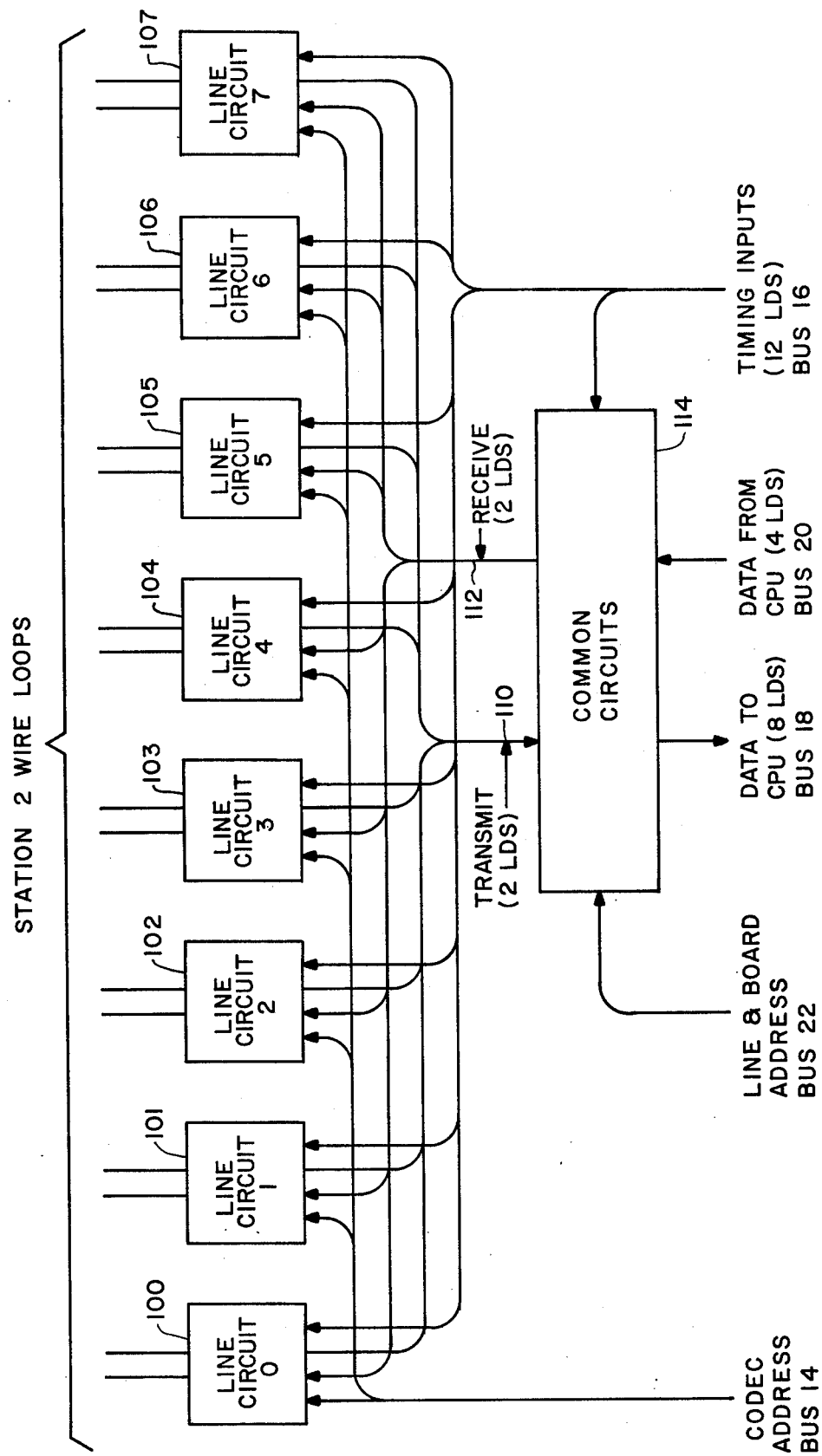
FIG. 2 is a block diagram showing the station line unit portion of the system of FIG. 1.

Referring now particularly to FIG. 2 of the drawings, the eight line circuits 100 through 107 are shown connected by common two-lead transmit and receive buses 110 and 112, respectively, to the common circuits 114. Note that two leads each are required to both transmit and receive information between the line circuits and the common circuits 114. One lead is for delta bits (delta modulation information bits) and the other is for signal bits, as will be described below.

On the other hand, four leads each are used to send and receive the delta bits and the signal bits between the central processing unit 2 and the common circuits 114. Thus there is a parallel to serial conversion accomplished by the common circuits 114. The multiplexed signaling information carried on one lead is changed only with every third delta bit. Each station line unit accomplishes a multiplexing and demultiplexing process; one of two such processes in the overall system. As will be explained further below, one transmit delta bit at a time is transferred from a line circuit 100–107 to the common circuit 114 and at the same time one receive delta bit from the CPU 2 is transferred from the common circuit 114 to one of the line circuits 100–107. During every third delta bit a signal bit is also transferred in and out of the common circuit 114. The three bit codec address from bus 14 controls which line circuit 100–107 will transfer information at any given time. This codec address corresponds to three bits of the line address on bus 22 and is used to address the buffer memory portion of the common circuits 114. The above described action takes place in all station line units simultaneously. That is, in systems having more than one station line unit, line circuit 1 will exchange information with its common circuits buffer memory in each of the several station line units at the same time. Next, all line circuits 2 in each station line unit will exchange information and so on.

It is necessary for the ten bit line address on bus 22 for a given line of a particular station line unit to be received at the common circuit 114 in order to cause the related transmit bits held in the buffer memory of common circuits 114 to be transferred to the CPU 2 and to be replaced by receive bits by the CPU 2. The receive bits held in the buffer memory of the common circuits 114 are then distributed to the line circuits and replaced by transmit bits from the line circuits.

Six timing inputs are required to control the transfer of bits in and out of the buffer memory of the common circuits 114. In addition, six additional timing inputs are required for other functions in the station line unit. These timing inputs are shown on common bus 16 and are defined further below.

Figure 3:
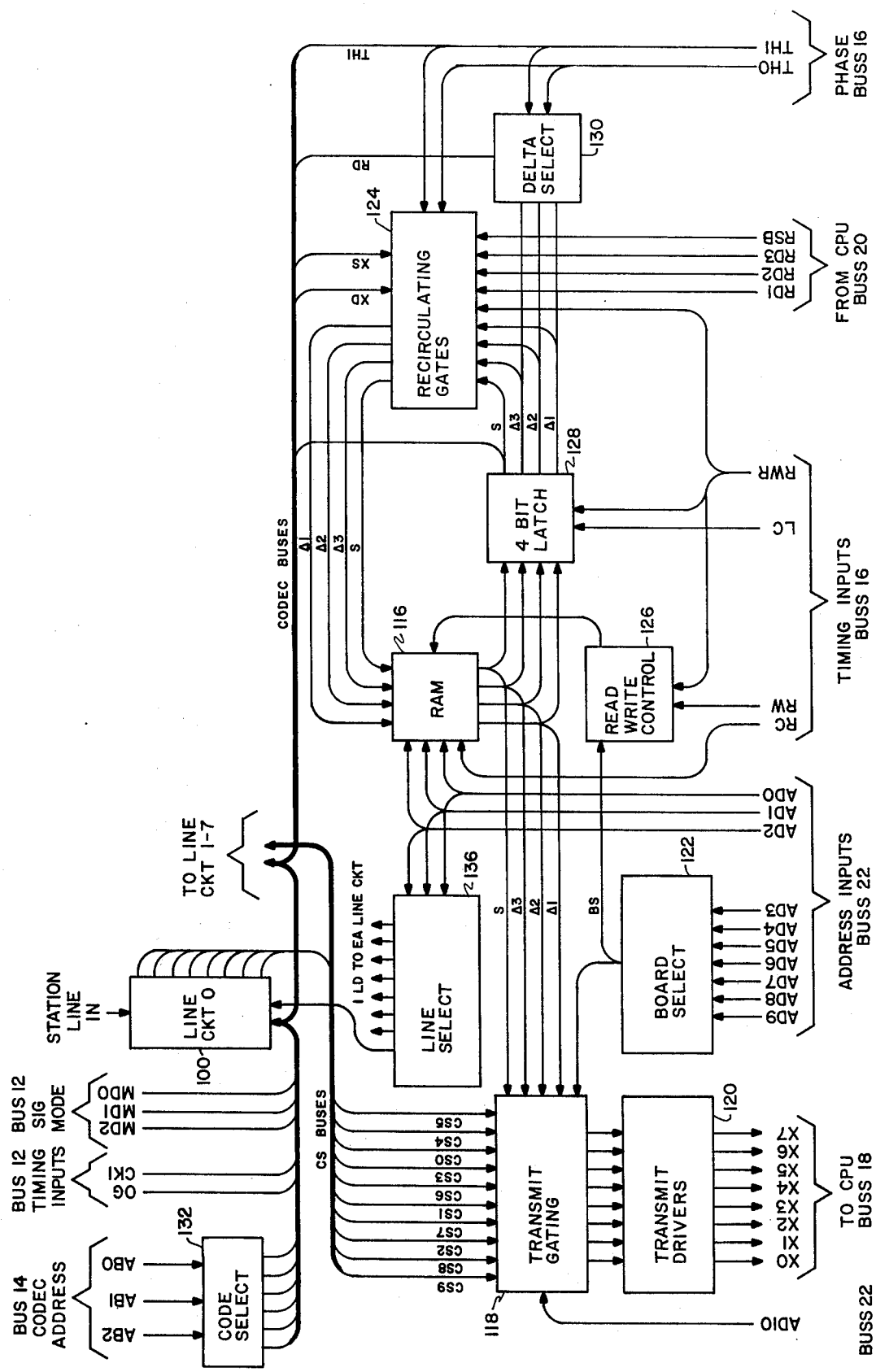
FIG. 3 is a block diagram showing the common circuits portion of the station line unit of FIG. 2.
Figure 4:
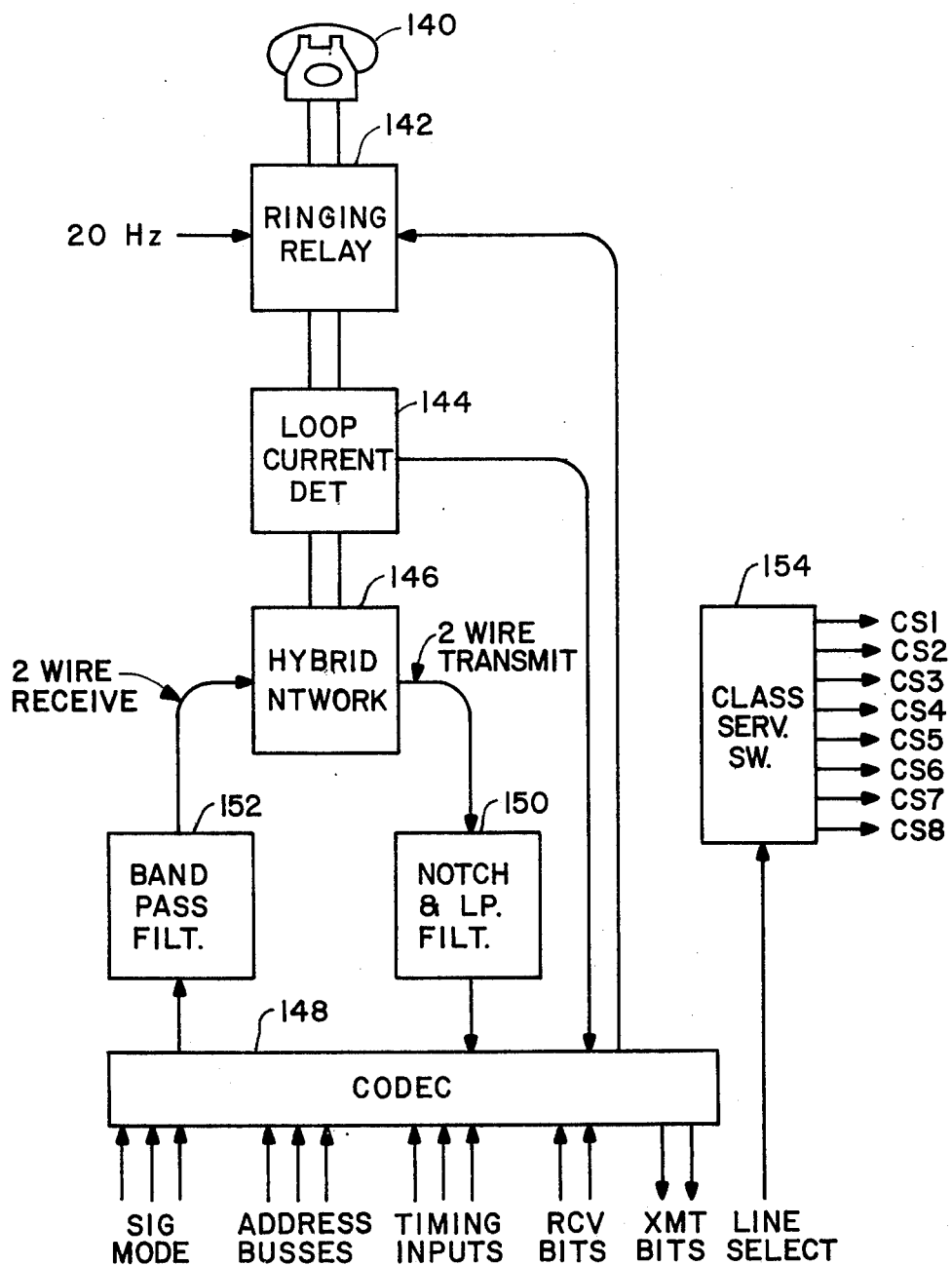
FIG. 4 is a block diagram showing the line circuit portion of the station line unit of FIG. 2.
Figure 5:
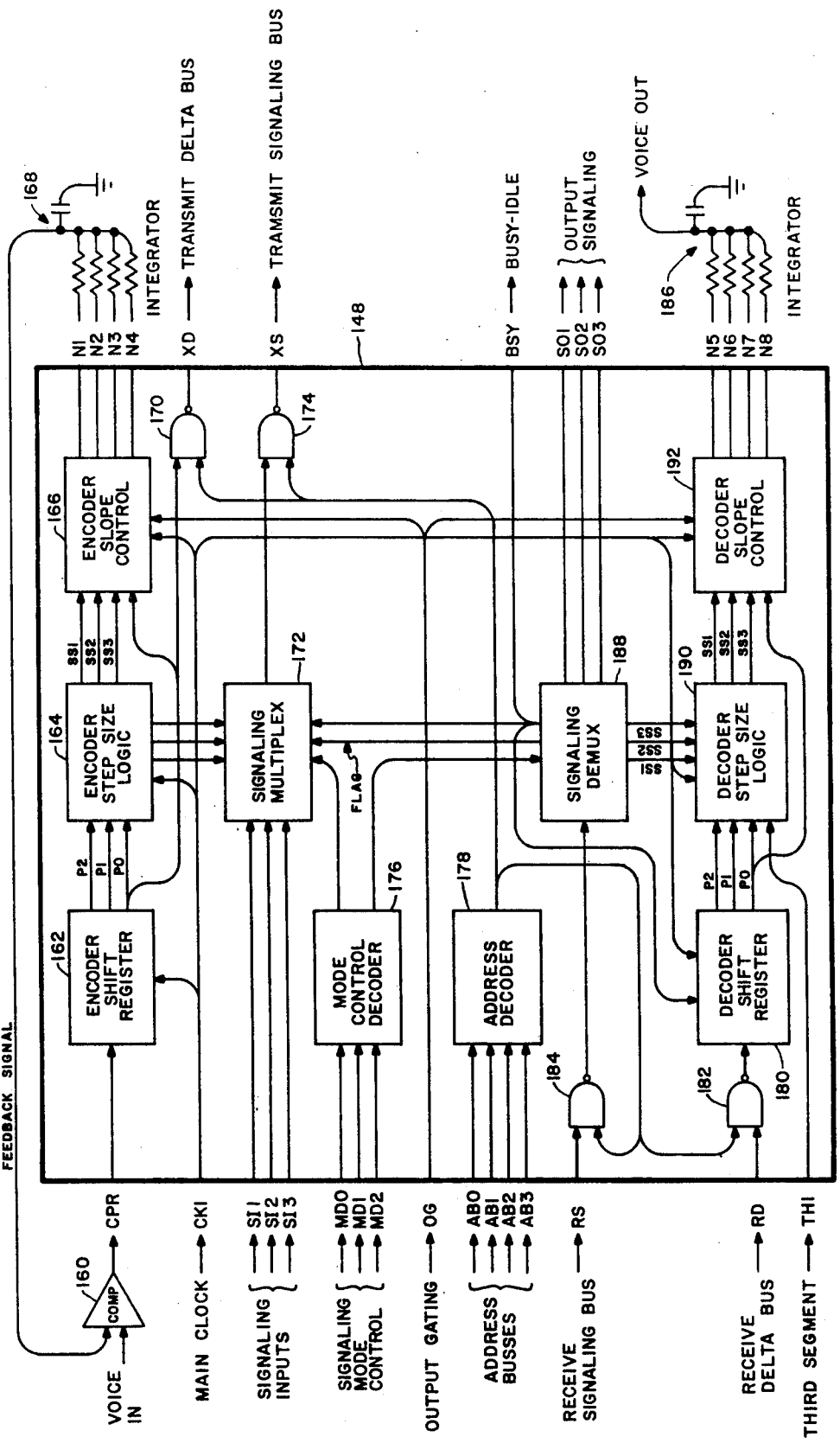
FIG. 5 is a block diagram showing the coder/decoder (codec) portion of the station line unit of FIG. 1.

For simplicity, the station unit block diagram of FIG. 2 is divided into three further diagrams. FIG. 3 shows the station line unit common circuits 114, FIG. 4 shows a typical station line unit line circuit 100 and FIG. 5 shows the codec portion of the line circuit.

Referring now to FIG. 3, the buffer memory 116 is preferably a random access memory RAM considered to be divided into two sections. Each section must be able to hold three delta bits and one signal bit from each of the eight line circuits. Therefore, a RAM with a 64-bit memory arranged in a 16 by four-bit word array is required. Eight of the four-bit words are considered to be in Section A of the RAM and the other eight four-bit words in Section B.

To start with, let us say that Section A of RAM 116 has been completely filled with transmit bits from each of the eight line circuits 100 through 107. When a line in this station line unit is addressed, it causes the three delta bits and signal bit associated with this line to be read out of the RAM 116 through the transmit gating stage 118 and into the transmit drivers 120 where they are amplified and delivered to the central processing unit via four transmit lines X4, X5, X6, and X7 of bus 18. The least significant bits (AD-0 through AD-2) of the ten bit address on bus 22 determine which group of four bits is to be transferred in or out of the RAM 116. The more significant bits AD-3 through AD-9 on bus 22 determine which station line unit is to be selected to transmit these bits. When this station line unit is correctly addressed, the board select 122 output BS permits the transmit gating stage 118 to function. The RAM control input RC (one of the timing inputs from bus 16) determines if section A or section B of the RAM 116 is to be addressed.

As soon as the transmit bits of a particular line are removed from the RAM 116, they are replaced by four receive bits from the CPU 2. The read-write-recirculate RWR control signal (from bus 16) gates the receive bits from the CPU 2 through the recirculate gates 124 and into the RAM 116. The board select BS and the read-write RW signal (from bus 16) are combined in the read/write control 126 to permit the RAM 116 to write in these receive bits.

While section A of the RAM 116 was facing outward to exchange bits with the CPU, section B was facing inward to exchange bits with the line circuits 100 through 107. At the end of one cycle of the CPU memory, both sections of the RAM 126 will have been filled with new bits from the line circuits and from the CPU. As this time the RAM 116 control signal RC (froms bus 16) is inverted to make, in effect, section A face in toward the line circuits and section B face out toward the CPU. Details of the CPU memory cycle are given below, however, for a present understanding of this section suffice to say that the memory cycle is divided into three phases. In phase 1, the RAM exchanges a first delta bit with each line circuit; in phase 2, it exchanges a second delta bit; and in phase 3, it exchanges a third delta bit and a signaling bit. Once per cycle the particular line circuit, if in use, will be addressed by the memory and an exchange of all four bits between the CPU and the RAM will take place. If the line circuit is not active the exchange will not take place, however, the line circuit encoder output is reflected to its input decoder.

It will be appreciated that the addresses in consecutive slots of the CPU memory will be somewhat randomly arranged. That is, line circuit 103 of the station line unit may be addressed in one slot and the next slot may be a line in another station line unit; it may be a trunk line; if the slot is not being used, it may be an empty address of all zero bits; or it may be a housekeeping, search or scan slot containing an address for a particular housekeeping, search or scan function, as will be explained below.

As mentioned above, a single cycle of the CPU memory is divided into three phases. During each phase the four bit words in section A (now facing inward toward the line circuits) of the RAM 116 will make a round trip from the RAM 116 through the four-bit latch 128, recirculating gates 124 and back into the RAM 116. During the phase 1 trip the receive delta 1 ($\Delta 1$) bits will be removed by the delta select stage 130 and delivered via the RD bus to each line circuit 100 through 107 in order. Also during phase 1, the recirculate gates 124 replace the delta one bits with transmit delta one bits from each line circuit in turn via the XD bus. During phases 2 and 3 receive delta 2 and delta 3 bits are updated by transmit bits in a similar manner. Also during phase 3, the receive signal RS bits are updated by transmit signal bits from the XS bus.

The RWR timing signal and latch clock pulse LC load the RAM 116 output bits into the four-bit latch 128. RWR also switches the recirculate gate 124 to feed the recirculating bits back into the RAM 116, and is combined with the RW signal in the read/write control 126 to permit the RAM 116 to write in these recirculating bits and the updating and signal bits from XD and XS buses. The three receive delta bits are selected out in proper sequence and a transmit delta and signal bits are inserted on their proper lead under the direction of the three phase control signals TH-0 and TH-1. The following table shows the bit status for TH-0 and TH-1 for each of the three phases.

| Phase | TH-1 | TH-0 |
|-------|------|------|
| I     | 0    | 0    |
| II    | 0    | 1    |
| III   | 1    | 0    |

The six output buses from the codec select stage 132 represent an inverted and a noninverted form for each of the three input bits AB-0 through AB-2. The three leads to be connected to a codec in a particular line circuit are so chosen that when the codec is addressed the signal on all three leads will be high. The codecs 0 through 7 are addressed in Gray count sequence (0-1-3-2-6-7-5-4) during each phase of the CPU memory. When the RAM 116 is exchanging bits with the line circuits, the RAM address AD-0 through AD-2 will agree with the codec address AB-0 through AB-2; thus the bits associated with each line will always be in their respective address location in the RAM. This occurs during every memory cycle whether or not the particular line circuit address of the specific station line unit is in the CPU memory. Thus, the RAMs 116 and the line circuit are continuously exchanging bits and sequence in each station line unit during every memory cycle of the CPU 2.

The station line units transmit to the CPU on the eight lines X0 through X7 on bus 18. During normal conversation, four class of service bits (CS) (class of service bits will be discussed further below), the three delta bits and the signal bit are transmitted. During all other times, the seven other class of service bits (thus all ten class of service bits) and the signal bit are transmitted. Which of the above groups is to be transmitted is controlled by the presence or absence of overflow bits (Address bits 10) applied to the transmit gating stage 118. The BS input to stage 118 permits the information to be transmitted only when this particular station line unit is selected by the input address on bus 22. Each of the selected bits to be transmitted is amplified in the transmit driver 120 before being applied to the transmit bus 18. The following table shows the assignment of information bits to the lines X0 through X7 and to the group controlled by the overflow bit (AD-10) timing gate pulse.

|                       | X0  | X1  | X2  | X3  | X4  | X5  | X6  | X7 |
|-----------------------|-----|-----|-----|-----|-----|-----|-----|----|
| overflow bit present  | CS0 | CS8 | CS7 | CS9 | Δ1  | Δ2  | Δ3  | S  |
| overflow bit absent   | CS0 | CS1 | CS2 | CS3 | CS4 | CS5 | CS6 | S  |

The line select stage 136 activates one lead at a time to each line circuit in turn as controlled by the address inputs AD-0, AD-1, and AD-2. Depending on the class of service switch position for each particular line circuit a pulse bit will be inserted on the associated CS-0 through CS-7 bus when the line circuit is addressed. These CS bits are connected through the transmit gating stage 118 to the transmit drivers 120 where they are amplified and delivered to the CPU via the transmit buses X0 through X7 in accordance with the above table.

Other inputs to the line circuits include the signal mode signals MD-0, MD-1 and MD-2 that determine what signaling information is to be transmitted or received. These change after every third delta bit. The signal mode signals will be described further below. The line circuits also receive clock signals CK-1 and OG which is twice the CK-1 clock rate. These signals will also be described further below.

Turning now to FIG. 4, the details of a typical line circuit 100 are shown. The two-wire line input from a station telephone set 140 is connected through the ringing relay through a loop current detector 144 to the hybrid network 146 where it is converted to four wires to separate the receive analog signal path from the transmitted voice path. When the codec 148 receives signaling bits representing ringing, it produces an output that activates the ringing relay to disconnect the hybrid 146 and apply 20Hz ringing voltage to the line. When the station goes off hook, the loop current detection stage 144 instructs the codec 148 to transmit signal bits representing loop current.

On the transmit side of the hybrid 46, the notch and low pass filters 150 remove 60Hz hum and undesired frequencies above 3600Hz before applying the voice signal to the codec 148. When the codec 148 is properly addressed a delta bit output is transmitted to the RAM 116 in the common circuits. The output of the delta modulation decoder in the codec 148 is integrated then bandpassed filtered before it is connected to the hybrid network 146. The bandpass filter 152 blocks DC and attenuates frequencies below 100Hz and above 3600Hz.

There are eight class of service switches 154 that may be manually set as desired to connect each class of service CS bus line to the line select input lead. When a station line on this particular station line unit is addressed, a signal pulse is applied to a line select lead and a switch selected CS bus. The CS buses are connected to the transmit gating stage on the common circuits.

Referring now to FIG. 5 wherein the details of the codec 148 are shown. The codec contains an encoder and a decoder for a companded delta modulation system. Further details of a suitable companded delta modulation apparatus are disclosed in the aforementioned copending patent application. The codec also contains stages for multiplexing and signaling. The stages for transmitting both voice and signaling information are shown in the upper portion of FIG. 5 and similar stages for receiving are shown in the lower portion of FIG. 5. The common control stages for the codec are shown in the center of the Figure. The delta modulation encoder includes a comparator 160, a shift register 162, step size logic 164, slope control 166 and integrator 168 and an output gate (NAND gate) 170. The voice input signal and the reconstructed feedback signal are applied to the comparator 160 input and the resulting output signal CPR is gated into the encoder shift register by the main clock pulse CK-1. The shift register 162 retains the three most recent delta bits and its three outputs represent the present bit P-0, the previous bit P-1 (past 1) and the one before the previous bit P-2 (past 2). When the codec is properly addressed the output gate 170 delivers the present delta bit P-0 to the transmit delta bus XD. The four address buses AB-0 through AB-3 provide for sixteen individual addresses: thus the delta bits from sixteen (only eight are used) separate codec outputs may be multiplexed in series onto the transmit delta bus. In the present system the AB-3 bus is not used since only eight codecs are associated with each station line unit. The higher level of multiplexing (to be described later in connection with the central processing unit) combines the delta bits from many station line units. The present delta bit P-0 is also delivered to the encoder slope control 166 where it determines the polarity of the voltage to be applied to the integrator 168 and thus controls the slope direction (up or down) of the feedback signal. The P-0, P-1 and P-2 delta bits are analyzed by the encoder step size logic 164 to obtain the required change in step size. The three outputs SS1, SS2 and SS3 form a three-bit word which represents the eight possible step sizes with 000 indicating the minimum step with a relative slope magnitude of 1 and 111 indicating the maximum step with a relative slope magnitude of 128. In the encoder slope control stage 166 the least significant bit SS1 determines if the output voltage is to be applied for full or half of the main clock period, while the SS2 and SS3 bits determine to which of the four integrator inputs N1, N2, N3 or N4 the voltage is to be applied. The output gating OG timing signal has a frequency double that of the clock pulse CK-1 and is used in controlling the timing of the applied voltage to the integrator.

Listed below are the eight individual signaling inputs that must be multiplexed together in series and gated onto the transmit signaling bus XS:
SS1 Step size least significant bit
SS2 Step size bit two
SS3 Step size most significant bit
SI1 Signaling input one (loop current)
SI2 Signaling input two
SI3 Signaling input three
BSY Busy-idle signal
FLAG general purpose tag signal The signaling multiplex block 172 selects the information to be applied to the transmit signaling bus XS via NAND gate 174. The particular signaling information to be transmitted or received at any particular time is selected by the mode control decoder 176 according to the status of the inputs MD-0, MD-1 and MD-2. The signaling mode changes after every third delta bit. Thus, the signaling bits gated onto the transmit signaling bus XS by the address decoder 178 are at the delta bit rate but groups of three successive bits from gate 174 will contain the identical signaling information. That is, signaling information is only updated every three delta bits.

Normally, the three step size bits need not be transmitted as signaling information since they are continuously updated in the decoder by an analysis of the received delta bit stream. If, by chance, a bit error is transmitted or the transmit and receive step sizes do not start together then there may be a difference in step size between the encoder and decoder. In this case, the encoder and decoder will continue to increase and decrease step size in unison, but the encoder may be one or two sizes larger or smaller than that being reproduced at the decoder. This condition may be self-correcting if the voice signal should have a quiescent moment where both the encoder and decoder step sizes would "bottom out", or when the step-size "tops-out" with a loud, high-pitched tone. If a voice conversation is taking place where there is a continuous background noise it may not contain a quiescent moment for self-correction of the step size. For this reason, the step size bits are also transmitted at a relatively slow rate to check and correct if necessary the step size bits being generated in the decoder.

The SI-1 and SI-2 signaling inputs represent loop current and ringing status. The SI-3 input may be used to represent other types of signaling inputs as desired.

The busy-idle status signal produced by the central processor unit is received from the receive signal bus RS, demultiplexed and then remultiplexed and transmitted on the XS output bus. The signal is also delivered to the BSY output where it may be used for traffic measurements. In the idle status it is fed back to the decoder shift register 180 to produce a continuous string of alternating 1 and 0 delta bits in order to simulate the quiet condition of a voice channel. The FLAG signal is received from the RS bus and retransmitted on the XS bus. There is no individual external connection provided for this signal. It is used as a general purpose tag signal, for example, as a lock out FLAG signal to indicate that a station receiver has been left off-hook without being connected to another party.

When the codec is properly addressed, the desired delta bits on the receive delta bus RD are delivered to the decoder shift register 180 through NAND gate 182 and the desired signaling bits on the receive signal bus RS are delivered to the signaling demultiplexer through NAND gate 184. The decoder stages are similar to the encoder stages, except that the integrator 186 output is used to recover the original analog voice signal. The SS-1, SS-2 and SS-3 signaling bits from the signaling demultiplexer 188 check and correct if necessary the decoder step size in logic 190. The third segment signal input TH-1 permits this step size correction to take place only during phase 3 of the memory cycle. The decoder further includes a slope control 192, such as in the encoder. The SO-1 and SO-2 signaling outputs control loop current and ringing. The SO-3 signaling output may be used for any desired control or it may be connected to the SI-3 input to retransmit the signaling information.

The arrangement of the trunk units 6 are similar to that of the line units 8. Each trunk circuit in the trunk unit 6 accepts eight central office or tie trunks, and each trunk circuit has an encoder/decoder circuit which is identical to that found in the station line unit. The common circuit, the interface with the central processing unit, is identical to that found in the station line unit.

The attendant line unit 4 has eight attendant lines which are encoded by an encoder/decoder circuit and stored in a random access memory in preparation for sending to the central processor unit. These lines share a single encoder/decoder circuit since the attendant can only use one loop at a time. The attendant line unit also has additional circuitry to encode the control buttons on the attendant console. In the attendant console there is circuitry to decode the status of the call being processed and to indicate this on the console display (not shown). All internal calling with call transfer and forwarding, camping on, consultation and conference calls can be made from the station. As certain classes of telephone can make outside calls without assistance, attendant involvement is reduced to directing general calls and assisting those calls without the dial out capability.

Figure 6:
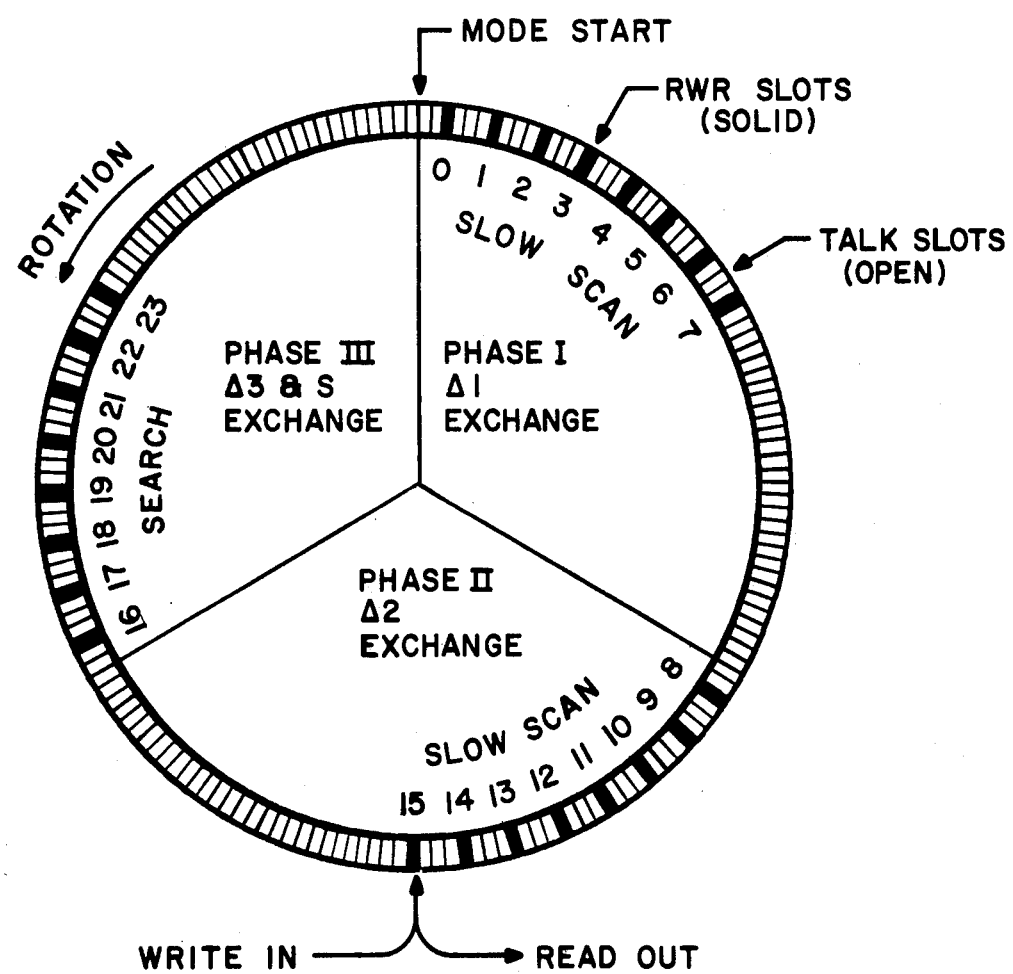
FIG. 6 is a conceptual timing diagram showing the arrangement of the memory drum of the recirculating memory of the central control unit in FIG. 1.

FIG. 6 is a schematic representation of the central processing unit 2 memory organization. The memory organization may be characterized as a drum rotating counter-clockwise having its periphery divided into 174 slots. The drum is divided into three phases, each comprises 58 slots. There are eight RWR slots (shown solid) in each phase. The first RWR slot is three slots into the phase and the subsequent RWR slots are space every four slots. The open slots are conversation or talk slots. During the RWR slot the codecs in the station line units exchange delta bits with the common circuit RAMS.

There are eight slots per phase to accomodate the eight line circuits for each SLU so that the delta bit exchanges take place one by one with each codec of a station line unit. In the first phase the delta one bits are exchanged, in the second phase the delta two bits are exchanged and in the third phase the delta three and signaling bits are exchanged so that by the end of the three phases of the memory drum (a complete cycle of the drum) the complete exchange has been made between every line circuit and its associated RAM. The RWR slots also provide a second function, namely, a housekeeping function in connection with the central processing unit 2. The RWR slots 0 through 15 are programmed for scanning hook state and line faults and RWR slots 16 through 23 are programmed as search slots. That is, during successive RWR slots the port circuits are interrogated one by one throughout the system according to a program. Thus, for example, in RWR slot 0 one particular port circuit in the entire system is scanned for its hook state or for a line fault. The search slots 16 through 23 interrogate each port circuit as to its class of service in order to identify, for example, a trunk, a tone decoder or conference port should one be required.

The codec delta bit rate is 56 kilo bits per second. There are three delta bits received from codec per memory drum cycle and the memory drum speed is 56,000 divided by 3. Since there are three delta samples per cycle the sampling is therefore at the codec delta bit rate of 56 kilo bits per second.

It will be observed that there are 150 total coversation or talk slots in a memory drum, plus 24 housekeeping RWR slots for a total of 174 slots. The slot width is 308 nanoseconds. As explained further below, each slot holds a triplet of words, thus the memory is 522 words long. Further organization of the memory slots is described below.

Each memory slot is essentially an independent entity and functions similarly to a separate computer. Thus, in effect, 174 spearate computers time share the same hardware.

III. CENTRAL PROCESSING UNIT

The central processing unit 2 must provide all the required timing waveforms required for delta modulation encoding and decoding and multiplexing/demultiplexing in the port units of the system that have been previously described. These waveforms are shown and described subsequently in connection with FIGS. 8 and 9. The central processing unit 2 provides a multiplicity of functions including providing the caller-called address pairs to designate the sources and sinks of delta and signaling bits in addition to providing memory space associated with each address pair to record the status of the call and for use as a "scratch pad" during call processing. The central processing unit must also periodically scan all lines of the system and note lines requesting service, assign time slots to those lines and for further signals received, complete the connection to another line or trunk and initiate ringing to the called party if it is an idle line, provide a ringback tone or busy tone if the called party is busy, initiate conversation mode if the called party answers and monitor the conversation for hangup or other signals. In general, the central processing unit 2 receives and interprets instruction signals from the line and processes the call by modifying the content of memory slots assigned to the particular line.

Figure 7:
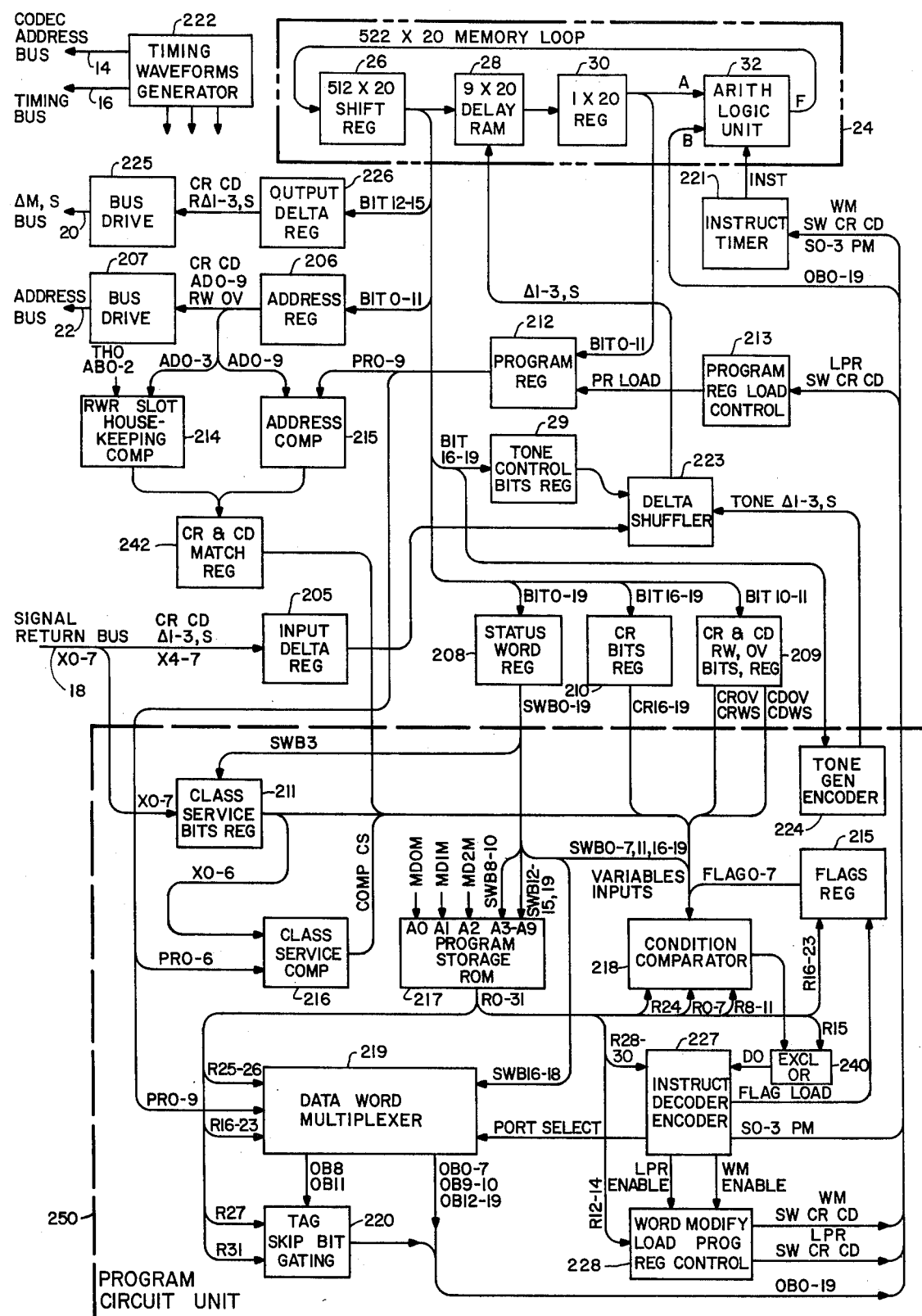
FIG. 7 is a block diagram showing the central processor unit 2 of FIG. 1 in greater detail.

Referring now to the details of FIG. 7, the system memory loop 24 is a 522 word by 20 bit recirculating memory consisting of: the 512 word by 20 bit shift register 26; the 9 word by 20 bit random access memory (RAM) 28, nine address locations of which are operated as a shift register; a 20 bit wide register stage 30; and an arithmetic logic unit (ALU) 32. The ALU is part of the recirculating memory loop 24, although it provides no storage. It passes the words unmodified from the A input through the output F or modifies the A input with the B input word according to program supplied instructions. The 522 words in the recirculating memory are organized as triplets of words and slots; the status word (SW), the caller word (CR), and the called word (CD). Table A shows the detailed organization of the SW, CR and CD words:

Table "A"

| | Organization of SW, CR, CD Words | | | | |
|---|---|---|---|---|---|
| | SW, CR, CD WORDS BIT POSITION | | | | |
| | 19 18 17 16 | 15 14 13 12 | 11 | 10 | 9 8 7 6 5 4 3 2 1 0 |
| CR | Caller-Bits (Memory) | $\Delta_1 \Delta_2 \Delta_3$ Sig. | Write Strobe | OV bit | Address-Bits |
| CD | Tone-Bits | $\Delta_1 \Delta_2 \Delta_3$ Sig. | Write Strobe | OV bit | Address-Bits |
| SW | Status-Word Memory Bits Preserved by 'Jump' & TM | Major Counter Bits | Tag Bit | Index Counter Bits | Status-Word scratch pad memory bits. |

The status word (SW) includes index counter bits (IX) 8 through 10 and major counter bits (MAJC) 12 through 15. These two sets of bits designate the program loop or program subroutine. AS explained further below, one of eight program steps in the subroutine are specified by the timing signals MD-0 through MD-2. The IX, MAJC, and MD-0 through MD-2 bits address the program storage read only memory 217, thereby identifying the particular program for that memory slot and the step in the program. The read only memory 217 provides a program statement in response to those inputs. The timing signals MD-0 through MD-2 automatically change, thereby carrying a slot through the steps of a subroutine as long as the IX and MAJC bits are not changed. The use of the status word scratch pad memory bits 0 through 7, the tag bit 11 and the status word memory bits preserved by "jump" 16 through 19 will be explained below.

The caller word (CR) and called word (CD) each include address bits 0 through 9 which define a particular port circuit in the system, and OV bit 10 which indicates whether the address is in the conversation mode or is in a signaling mode of operation, a write strobe (RW) bit 11 and the delta modulation and signal bits 12 through 15. The bit position 16 through 19 of the CR word are caller - top bits which will be explained further below and the bit position 16 through 19 of the CD word are tone bits which will be explained further below.

From the output of the 512 word shift register 26, the CR and CD addresses are alternately strobed into the address register 206 for output to the multiplex, demultiplex address bus 22 via bus driver stage 207. These outputs are the first twelve bits of the CR and CD words which include the CR and CD addresses AD-0 through AD-9 plus the OV and RW bits. The OV bit (class of service control bit) selects the delta/signaling bit inputs or class of service bit inputs of the transmit gating 118 of the station line unit common circuit as shown in FIG. 3.

The ten bit delay provided by memory 28 and memory 30 provides time for propagation delays in the CPU 2.

While bits 0 through 11 of the CR and CD words are strobed into address register 206, bits 12 through 15 of the CR and CD words are alternately strobed into output delta register 226. These bits comprise the three delta bits and the signaling bit. Bus driver 225 applies the output of register 226 to bus 20.

The signals on buses 20 and 22 provide bits 0 through 15 of the CR and CD words to the port units. These signals together with the timing wave forms on buses 14 and 16, to be described further below in greater detail, from the timing waveforms generator 222 of the central processing unit 2 provide all the signals required for operation of the port units.

The timing waveform signals provided by timing waveforms generator 222 include TH-0, TH-1, AB-0, AB-1, AB-2 RC, LC, RWR, CK-1, OG, MD-0, MD-1, and MD-2.

It should be understood at this point that the bits 0 through 11 of every CR and CD word as they come up in the recirculating memory are outputted to the station line units and trunk units in order to effect an exchange of information between the caller and called addresses. The pecise manner of exchanging this information will be described below. However, at this time it is important to understand that this exchange occurs during every memory cycle when the caller and called words appear at the output of the shift register memory 26.

On the other hand, functions which require processing by the program section of the central processing unit are effected only every fifth cycle of the memory. The portion of the central processing unit providing the program function is shown within dashed lines and is designated by reference numeral 205.

At the output of the 512 word memory 26, one out of every five status words (SW) bit 0 to bit 19 are strobed into status word register 208, bits 10 and 11 of the CR and CD words associated with that status word (SW) are strobed into register 209 (bits 11 and 10 are the write strobe RW and the class of service control bit OV, which determines whether the port circuit is operating in the conversation or nonconversation mode), the CR bits 16 through 19 are strobed into register 210 and the caller or called bits X-0 through X-7 from the input bases (as controlled by status word bit 3: SWB 3 is 0 for caller; 1 for called) are strobed into class of service bit buffer register 211. X-4, X-5, X-6 and X-7 are also strobed into the delta/signaling buffer register 205 of the CPU 2.

At the output of the 1 by 20 bit register 30 bits 0 to 11 of a selected word may be loaded into the 12 bit program register 212 under the program load control signal from block 213. The content, bit 0 to bit 9 of the program register 212, is compared with bit 0 to bit 9 of the caller or called words from the address register 206 in address comparator 251 and match signals are recorded in the compare CR and compare CD register 242 for program use as will be explained below.

As described above, during the RWR slots of the memory drum cycle, codecs in port units exchange delta bits with the RAM in the common circuits of the port units, thus the last three bits of the CR address must be the same as the corresponding bits of the CD address for the RWR slots, and must be sequentially labeled so as to take the eight port unit circuits in sequence. Also, in those RMR slots which are used for the scanning of hook state and line faults (RWR slots 0 through 15) the least significant four bits are numbered consecutively so that each slot scans 1/16 of the system addresses over a period of memory cycles. It should be understood that at a given time a particular slot addresses only a single address. This is accomplished by the RWR slots housekeeping comparator 214, which compares the RWR slot CR and CD address bits 0 to 3 with AB-0 to AB-2 and TH-0, the codec address and first third signal from timing waveforms generator 222. The output of comparator 214 is used as an input for the slow scan housekeeping program, which increments the address until match occurs, resulting in the desired labeling. The labeling of address bits 0-2 must correspond to AB-0 to 2 in order to exchange data between the correct line circuit and common circuit RAM address. Similarly for RWR slots 16 to 23, used for search slots, the bits CR-0 to 2 and CD-0 to 2 are compared with AB-0 to 2, match recorded and used as inputs to the search slot housekeeping program which increments the address until match occurs. These program functions will be described further below.

The content of the program register 212 may be inserted into the SW, CR or CD word (that is, replace the word in the location specified) under program control. Thus with the program register 212 and the address comparator 251 it is possible to load the program register with a word and to check the memory for a matching word, if any. The content of the program register 212 may also be inserted by ALU 32 in a memory location specified by the program. This will be described further below. Since there is only one program register 212, the central processing unit can deal with instructions of the program requiring the use of the program register only one at a time. This requires the use of a marker or instruction register; an eight-bit flags register 215 to record and signify the state of the CPU for functions requiring the program register 212. The flags register 215 is also used in certain cases not requiring the program register 212. The flags register 215 receives as a data input bits R16–23 of the ROM 217 and is loaded under control of instruction decoder/encoder 227. The flags register 215 has an 8-digit output FLG-0 through 7 — the flag code — which is an instruction and is shown in Table B and will be explained further below. A memory slot using the program register 212 sets the flags register 215 to a code other than the idle code and when the operation is completed changes it back to the idle code. The flag code is used also to record the type and stage of operation being performed. Any function of the CPU requiring the program register 212 must be indicated in the flags register 215. The flags register 215 can also be used as a message transfer buffer: specific flags codes can be set by one memory slot and then read and acknowledged by another.

Table B

| Flags OX<br>O TIMED OUT | | FLAGS DEFINITIONS | | |
|---|---|---|---|---|
| Flags 1X<br>initiate active slot.<br>Flags 2X<br>initiate passive slot. | insert PR into CR with WS in M3, change flags to BX, tag CROV<br>insert PR into CR without WS in any mode, change flags to BX, tag CROV | 0<br>1<br>1<br>2 | insert new party<br>insert display<br>insert attn conversation slot.<br>insert register | 2 insert C.B. #2<br>3 insert CB slot # 1.<br>3. insert Attn. dial slot. |
| Flags 3X<br>Request Search | passes thru minimum of 20 instructions before entering search | 0 | request search | |
| Flags 4X<br>Transfer | | 0<br>1 | Transfer<br>camp on | 2 override<br>3 identify |
| Flags 5X<br>drop register/<br>slot attn. CR | | 0<br>1 | 12 sec timed-out<br>Merge Reg & CR slot | |
| Flags 6X<br>Flags 7X | Camp on<br>Pickup | 0<br>0 | Camp on<br>Send adapter to be picked up. | 2 give page # |
| Flags 8X<br>Flags 9X<br>inter slot<br>function 1 | Insert passive CD slot | 0<br>0<br>1<br>2<br>3 | 4th digit TTR set up<br>Find type 1 CF #<br>Find type 2 CR #<br>Find type 3 CR #<br>drop particular CF | 1 page passive CD slot<br>4 Find remote CF pair<br>5 Check for 2nd slot in conv.<br>6 Drop attn dial slot<br>7 Drop all CR pairs |
| Flags AX<br>inter slot function 2 | | 0 | activate passive (hold only) | |
| Flags BX<br>completion code | | 0 | Completion/masking flags merge message acknowledgement. | |
| Flags CX<br>identify | Spare | | | |
| Flags DX<br>Searching | | 0 | Searching | |
| Flags EX<br>Flags F | Spare | 0<br>8<br>F | Idle<br>Idle<br>Error (MJA). | |

The information from the signal return bus 18 (lines X-0 through X-7) associated with a caller or called address is strobed into register 211 regardless of whether the status word SW bit 3 equals 0 for caller or 1 for called. The CR and CD signaling bit from X-7 is stored separately and independently of SW bit 3 in register 211 and X0 → X6 contained in register 211 is then compared in class of service CS comparator 216 with the contents of the program register 212 PR-0 through PR-6 to give the output code compare class of service signal (COMPCS) which is used as a condition variable input for the program circuits.

The status word SW bits 8-10, 12-15 associated with the memory slot are used to specify the subroutine of the program located in that slot. Note the organization of the status word SW in Table A above. Timing waveform bits MD-0 to MD-2 specify one of eight program steps in the subroutine in which the slot is located at a given time. Thus the timing waveforms MD-OM to MD-2M (the "M" suffix indicates a slight timing modification of buffering) and the status word bits 8 through 10 and 12 through 15 are used to address the program storage read only memory 217 as inputs A-0 through A-9.

A program statement is specified by the 32 bit output R-0 through R-31 of the program storage ROM 217. The format for the program statement is shown in Table C:

TABLE C
PROGRAM STATEMENT FORMAT
PROGRAM-STORAGE ROM OUTPUT BIT POSITION

| 15 | 14 13 12 | 11 10 9 8 | 7 6 5 4 3 2 1 0 |
|---|---|---|---|
| Go bit | SW CR CD<br>Word-Modify<br>Bits | Variable-Group<br>Select Bits | Variable:<br>Comparand<br>Bits |

PROGRAM STORAGE ROM OUTPUT BIT POSITION

| 31 | 30 29 28 | 27 | 26 25 | 24 | 23,22...17,16 |
|---|---|---|---|---|---|
| Skip Bit | Operation-Code Bits | Change Tag | Field Select | Type of Compare | Program |

TABLE C-continued

| Bit | Bits | Bit | Data-Word |
|---|---|---|---|

Bits R-0 through R-7 are the variable compared bits; these are the bits that the selected variables to condition comparator 218 are to be compared to. Bits R-8 through R-11 select the group of variables of the variables input to condition comparator 218 that are to be compared. Bits 12 through 14 are the CD, CR and SW word-modified bits and these form a portion of the second part of the program instruction that will be explained further below. The $\overline{\text{GO}}$ bit 15 causes an AND or NAND operation to be executed. That is, if the condition compare is successful and the $\overline{\text{GO}}$ bit 15 is 0 then the instruction is to be executed; if the $\overline{\text{GO}}$ bit is 1 the instruction is to be executed if the compare is not successful. Bits R-16 through R-23 are the program data word and as will be explained further below this word is sometimes chosen by the data word multiplexer 219 for insertion in the program register or into a slot of the recirculating memory 24. Bit R-24 determines the type of comparison that is to be made between the input variables to condition comparator 218 and the variable comparand bits which are R-0 through R-7. This will be explained further below. Bits R-25 and R-26 are field select bits and form part 3 of the program instructions and these will be explained further below in conjunction with Table F. Bit R-27 is the change tag bit and this will also be further described below. Bits R-28 through R-30 comprise the first part of the program instructions and these are also explained further below. Bit R-31 is the skip bit which is discussed further below.

Condition comparator 218 is used to sense whether the program step should be executed. Bits R-8 through R-11, R-0 through R-7 and R-24 are used to set up the condition comparator 218. At the variables inputs the condition comparator receives the outputs of registers 208, 209, 210, 211, 215, 216 and 242. The compare output is applied to Exclusive-OR gate 240 that also receives the $\overline{GO}$ bit R-15 to provide the execute command signal to instruction decoder/encoder 227.

Referring to Table D the condition variable table, note that 16 sets of 8 variables each are listed:

cuted if the condition comparator 218 gives a successful output. If R-15 equals 1 the instruction is executed only if the compare is unsuccessful.

The instruction for a given program step is executed if the conditions are right, as described previously. The Table D

| | 0 | | 1 | | 2 | | 3 | | Condition Variable 4 | | 5 | | 6 | | 7 | |
|---|---|---|---|---|---|---|---|---|---|---|---|---|---|---|---|---|
| | CRB19 | F | TH1 | F | "0" | F | SWB3 | F | FLG 2 | F | SIG CR | F | T | F | CFO | F |
| | CRB18 | F | RWR | F | T | F | SWB2 | F | FLG 1 | F | SIG CD | F | SWB1 | F | RNA | F |
| | CRB17 | F | CRINT | F | CROV | F | SWB17 | F | FLG 0 | F | SIG CR | F | SWB0 | F | | F |
| | CRB16 | F | CDINT | F | CDOV | F | SWB16 | F | CROV | F | SIG CD | F | "0" | F | CONF | F |
| | T | 1 | φ1 | 1 | | 1 | SWB0 | 1 | FLG 3 | 1 | Timer 1 | 1 | SWB16 | 1 | DELUXE | 1 |
| | SWB0 | 1 | | 1 | Timer 2 | 1 | SWB1 | 1 | SWB1 | 1 | SWB16 | 1 | SWB16 | 1 | TANDEM | 1 |
| | CRINT | 1 | CRWS | 1 | SWB18 | 1 | T | 1 | T | 1 | 1 | 1 | | 1 | Spare 1 | |
| | CDINT | 1 | CDWS | 1 | SWB19 | 1 | | 1 | | 1 | T | 1 | | 1 | Spare | 1 |
| | 8 | | 9 | | A | | B | | C | | D | | E | | F | |
| | CS0-0 | F | | F | SWB7 | F | SWB19 | F | FLG 7 | F | FLG 7 | F | FLG 7 | F | FLG 7 | F |
| | CS4-1 | F | | F | SWB6 | F1 | SWB18 | F | FLG 6 | F | FLG 6 | F | FLG 6 | F | FLG 6 | F |
| | CS7-2 | F | | F | SWB5 | F | SWB17 | F | FLG 5 | F | FLG 5 | F | FLG 5 | F | FLG 5 | F |
| | CSR-3 | F | | F | SWB4 | F | SWB16 | F | FLG 4 | F | FLG 4 | F | FLG 4 | F | FLG 4 | F |
| | Δ1-C55 | 1 | | 1 | CROV | 1 | T | 1 | CROV | 1 | COMPCS | 1 | COMP-CD | 1 | COMPCR | 1 |
| | Δ2-C56 | 1 | | 1 | CDOV | 1 | SWB0 | 1 | SWB0 | 1 | CDOV | 1 | T | 1 | SWB1 | 1 |
| | Δ3-C59 | 1 | | 1 | FLG 3 | 1 | SWB0 | 1 | T | 1 | CROV | 1 | | 1 | COMPCS | 1 |
| | SWB1 | 1 | | 1 | SWB2 | 1 | T | 1 | | 1 | CDOV | 1 | | 1 | SWB0 | 1 |

These variables refer to the memory slot in process. The decision to execute or not execute an instruction of a program step is based on the program specified combination of variables in the condition variable table of Table D. Specifically, bits R-8 through R-11, the variable-group select bits, select one of the set of sixteen variables to be compared in comparator 218 with the variable-comparand bits R-0 through R-7. R-24 specifies the type of compare operation. That is, if R-24 equals 0, a "ones" compare is called for. In a ones compare if the input variables are ones where bits R-0 to R-7 are 1, the compare is successful. If R-24 equals 1, then the "mixed" compare is required. The variables 4 to 7 must match the bits R-4 to R-7 bit for bit and variables 0 to 3 must be ones where R-0 to R-3 are ones. Bit R-15 (the "GO" bit) if 0 enables the instruction to be exeinstruction consists of three parts. The first part specifies the type of operation to be performed, for example; add, load flags and program register (LFP), etc. as defined by Table E:

Table E.

| | Operations Definition |
|---|---|
| INS. = | Insert, ALU F = B data, Mode - high, $\overline{S0}$, S1, $\overline{S2}$, S3 Insert specified 8-bit into the specified portions of the specified word in shift register. Load 0's into remaining unspecified bits. |
| JMP = | Insert, except bits 16, 17, 18, 19 = SWB16, 17, 18, 19 respectively. |
| ADD = | Add, ALUF - A plus B data, Mode = low, S0, $\overline{S1}$, $\overline{S2}$, S3 Add specified 8-bit data to the specified portions of the specified word in shift register. (0's added in the remainind unspecified bit) |
| SUB. = | Subtract, ALU F = A minus B data, Mode - low, $\overline{S0}$, S1, S2, S3. Subtract specified 8-bit data from the specified portions of the specified word in shift register. (0's subtracted from the remaining unspecified bit) |
| SET = | Set, ALU F - A or B data, Mode - high, S0, S1, S2, S3. Set specified bits (max. 8-bits) in the specified portions of the specified word in shift register. |
| CLR = | Clear, ALU F = A and $\overline{B}$ data, Mode = high, S0, S1, S2, S3. Clear specified bits (max. 8-bits) in the specified portions/of the specified word in shift register. |
| LFP = | Load Flags Program register, ALU F = Add, Mode = Low, S0, D1, S2, S3. Load flags with specified 8-bit data if data source specified L, EXOR previous flags with specified data word if data source specified M. Load program register with specified data source Skip and Tag change operate on execution of LFP (GO). |
| ILF = | Insert, Load Flags, ALU F = B data, Mode = high, $\overline{S0}$, S1, S2, S3. Insert program register contents into bit 0 to bit 9 of specified word, a 1 into bit 10 (CROV, CDOV) and skip bit 11 (WS). Load flags with specified 8-bit data if data source specifies L, EXOR previous flags with specified data word if data source specifies M. |

The eight instructions are specified by three bits, R-28, 29 and 30 (shown in Table G, i.e. —"001" is ADD), which are decoded the encoded by block 227 into several control codes depending on the operation code. If the operation requires the ALU 32 to perform certain instructions, then the control code S-0 to S-3 and PM is provided. Outputs LPR (load program register) and WM (word modify) are applied to the word modify and load program register control 228. Block 228 also receives bits R-12 through R-14 from the program storage ROM 217. These are the CD, CR and SW word modify bits. Block 228 provides two sets of outputs: word modify SW, CR or CD and load program register SW, CR or CD. The word modify output along with S-0 through S-3 and PM are applied to the instruction timer 221, which provides instructions to the ALU 32. The LPR, SW, CR or CD output is applied to the program register load control 213, which provides the program register load signal to the program register 212. For the LFP operation, the program register load control 213 is enabled and in the cases LFP and ILF the flags register 215 is enabled by the flag load line.

The second part of the program instruction specifies which of the SW, CR or CD words are to be modified. This is specified by R-14, 13 and 12, respectively, except in the case of LFP where these bits specify which of SW, CR and CD is to be loaded into the program register.

The third part of the instruction, bits R-25 and R-26 specify which 8 bits of the word or words the program data word is to act on (for the operations add, subtract, clear set, insert and jump) as shown in Table F:

Table 'F'

| Mnemonic | $R_{26}$ | $R_{25}$ | \multicolumn{20}{c}{Operand Fields} |
| | | | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|
| T L' | 0 | 0 | 0 | 0 | 0 | 0 | 0 | 0 | 0 | 0 | 0 | 0 | 0 | 0 | $R_{23}$ | $R_{22}$ | $R_{21}$ | $R_{20}$ | $R_{19}$ | $R_{18}$ | $R_{17}$ | $R_{16}$ |
| T M | 0 | 1 | 0 | 0 | $R_{21}$ | $R_{20}$ | $R_{23}$ | $R_{22}$ | $R_{21}$ | $R_{20}$ | $R_{19}$ | $R_{18}$ | $R_{17}$ | $R_{16}$ | 0 | 0 | 0 | 0 | $R_{19}$ | $R_{18}$ | $R_{17}$ | $R_{16}$ |
| L | 1 | 0 | $R_{23}$ | $R_{22}$ | $R_{21}$ | $R_{20}$ | 0 | 0 | 0 | 0 | $R_{19}$ | $R_{18}$ | $R_{17}$ | $R_{16}$ | 0 | 0 | 0 | 0 | $R_{19}$ | $R_{18}$ | $R_{17}$ | $R_{16}$ |
| M | 1 | 1 | $R_{23}$ | $R_{22}$ | $R_{21}$ | $R_{20}$ | 0 | 0 | 0 | 0 | $R_{19}$ | $R_{18}$ | $R_{17}$ | $R_{16}$ | 0 | 0 | 0 | 0 | $R_{19}$ | $R_{18}$ | $R_{17}$ | $R_{16}$ |

Note that R-25 and R-26, define L, M, TL and TM. Note that for field L (R-25, R26 equals 0,0) the program data word acts on bits 0 through 7 of the selected SW, CR or CD word. Similarly, for field TM (R-25, R-26 equals 1,1) bits R-16 through R-19 act on bits 8 through 11 and bits R-20 through R-23 act on bits 16 through 19 of the SW, CR or CD word.

Referring to Table G, the data word multiplexer 219 is organized as five blocks of four bits each, labeled block 0 to block 4:

Table 'G'

Data-Word Multiplyer Organization
Block '0' = 0B0→0B3 Block '1' = 0B4→0B7, Block '2' = 0B8→0B11
Block '3' = 0B12→0B15, Block '4' = 0B16→0B19.

| Field Select Code | | L (00) | | | | | M (01) | | | | | TL (10) | | | | | TM (11) | | | | |
|---|---|---|---|---|---|---|---|---|---|---|---|---|---|---|---|---|---|---|---|---|---|
| Operation | Block # | 0 | 1 | 2 | 3 | 4 | 0 | 1 | 2 | 3 | 4 | 0 | 1 | 2 | 3 | 4 | 0 | 1 | 2 | 3 | 4 |
| ADD | (001) | 0 | 0 | X | X | X | X | X | 0 | 0 | X | X | 0 | X | 0 | X | 0 | X | X | X | 0 |
| SUB | (010) | 0 | 0 | X | X | X | X | X | 2 | 2 | X | X | 0 | X | 0 | X | 0 | X | X | X | 0 |
| SET | (100) | 0 | 0 | X | X | X | X | X | 2 | 2 | X | X | 0 | X | 0 | X | 0 | X | X | X | 0 |
| CLR | (110) | 0 | 0 | X | X | X | X | X | 2 | 2 | X | X | 0 | X | 0 | X | 0 | X | X | X | 0 |
| INS | (011) | 0 | 0 | X | X | X | X | X | 2 | 2 | X | X | 0 | X | 0 | X | 0 | X | X | X | 0 |
| JUMP | (101) | 0 | 0 | X | X | 1 | X | X | 0 | 0 | 1 | X | X | 0 | X | 1 | 0 | X | X | X | 1 |
| LFP | (111) | X | X | X | X | X | X | X | X | X | X | X | X | X | X | X | X | X | X | X | X |
| ILF | (000) | 1 | 1 | 1 | X | X | 1 | 1 | 1 | X | X | 1 | 1 | 1 | X | X | 1 | 1 | 1 | X | X |

Note: Numbers in Table refers to port # selected for the corresponding block # output.
X = No port selected, giving '0's output for block.

| Port # | Block # | 0 | 1 | 2 | 3 | 4 |
|---|---|---|---|---|---|---|
| 0 | | $R_{16} \to R_{19}$ | $R_{20} \to R_{23}$ | $R_{16} \to R_{19}$ | $R_{20} \to R_{23}$ | $R_{20} \to R_{23}$ |
| 1 | | $PR_0 \to PR_3$ | $PR_4 \to PR_7$ | $PR_8, PR_9, 1,$ Skip. | Skip,0,0,0. | $SW16 \to SW18,$-TM |

Symbols in Table refer to inputs to ports.

This third part of the instructions selects which two blocks of the output contains the program specified 8 bits R-16 to R-23 in the cases of operations other than jump, LEP and ILF. As shown in Table G nonselected blocks give 0 outputs. The data word multiplexer 219 is a two to one multiplexer with outputs OBO-19. Ports 0 and 1 are for inputs from the program data word from block 217 and the program register 212 content, respectively. The upper part of Table G indicates the ports to be selected in each block of the lower part of Table G. Thus if ADD is the operation code defined by bits R28-30 and L is the operand fiedl defined by bits R-25-R-26, block 0, port 0 an block 1, port 0 are selected to choose R16-R23 from the program ROM 217. For another example, for CLR and TM, block 2, port 0 and block 4, port 0 are selected to again choose R16-19 and R20-23.

In the case of the operation ILF, port 1 is used in blocks 0 to 3 and the output data word OB-0 to OB-9 is equal to PR-0 to PR-9, OB-10 equals 1 and OB-11 and OB-12 equals SKIP BIT in instruction and OB-13 to OB-19 equals 0. For the jump operation one or more of the blocks numbered 0 to 3 are selected, block 4 is also selected with port No. 1 which has status word bits 16 to status word bit 19 as inputs. If the "skip" bit R-31 is present and the operation is ILF and if the condition for execution of the operation was met then 1 is set in bit 11 and 12 of the word, (bit 10 is always 1 for an executed ILF operation), for example, for skip ILF LCR (L is the field select code), the CR write strode and signal bit are set to 1. If R-31 equals 0 then only the CR OV bit is set to 1. That is, R-31 has a different meaning for ILF operations. For instructions with LEP operation successful execution for R-31 equals 1 results in the slot skipping to the next index count. For instructions with LFP, r-27 equals 1 means change tag bit on successful execution of operation. If R-31 is equal to 1 when the operation is add, substract, set, clear, insert, CR jump then on failure to execute the operation, one is added to the status word bit eight position, causing the slot to "skip" to the next index count. If the change tag bit R-27 equals 1, then the status word bit 11 is exclusive OR-ed with one on failure to execute any of the operations (this is also true for ILF operation). These two features are implemented by logic gating 220 after the data multiplexer 219 at the bit positions 8 and 11, respectively. Note that in the case of LFP/ILF operations, the program data word of 8 bits is not used at the ALU 32 but is used for modifying the content of the flags register by modifying the contents with R-16 through R-23. The 20 bits of the data word multiplexer 219 is fed to the "B" input of the arithmetic logic unit 32. The operation code for the ALU 32 with the word modify SW, CR, CD and timing signals is fed to the instruction timer 221 that enables the instruction when the designated SW, CR and CD reaches the "A" input of the ALU 32; that is, the ALU operates on the slot whose status word was strobed into the register from the output of the 512 word register 26 and which arrives at the "A" input 10 word periods later. Recall that only every fifth of the passing slots of the memory (triplets of words SW, CR and CD) are processed, thus the entire content of the memory is examined and processed through one program step in each five recirculation cycles. Each slot is at a particular step of its own program. Thus there are as many simultaneous programs runing as there are memory slots.

The LPR (load program register) instruction with the word modify bits from block 227 result in LPR SW, LPR CR, and LPR CD signals from the word modify and load program register control 228 are applied to the program register load control 213, which together with supplied timing signals load the SW, CR or CD of the designated slot into the program register 212.

The tone generator 224 consists of audio tone oscillators driving encodes in a circuit similar to the encoder of the station line units, except that the RAM is not written into from the outside and that the CPU supplies the tone address as the RAM address and receives delta 1, 2, 3 and signals for the tone signal address.

The delta shuffler 223 works as a switching yard for conversational and tone delta and signaling bits, as shown in Table H.

Table 'H'
Delta-Shuffler Action

IN CONVERSATION MODE
CR Δ Bits→CD
CD Δ Bits→CR
CR Sig bit modes busy, flag, Sig 3, Ring→CR
CR Sig bit modes $SS_1$, $SS_2$, $SS_3$, loop current→CD
CD Sig bit modes busy, flag, Sig 3, Ring→CD
CD Sig bit modes $SS_1$, $SS_2$, $SS_3$, loop current→CR

IN TONE MODE 1, CR, CD BOTH HEAR TONES
Tone Δ bits →CR, CD.
Tone Sig Bit Modes $SS_1$, $SS_2$, $SS_3$, LC→CR, CD.
CR Sig Bit Modes Busy, Flag, Sig 3, Ring→CR
CD Sig Bit Modes Busy, Flag, Sig 3, Ring→CD

IN TONE MODE 2, CR HEARS TONE ONLY
Tone Δ bits→CR
CR Δ bits→CD
Tone Sig Bit Modes $SS_1$, $SS_2$, $SS_3$, LC→CR
CR Sig Bit Modes Busy, Flag, Sig 3, Ring→CR
CR Sig Bit Modes $SS_1$, $SS_2$, $SS_3$, LC→CD
CD Sig Bit Modes Busy, Flag, Sig 3, LC→CD In the conversational case, the delta 1, 2, 3 signals are exchanged between CR and CD and the signaling bit exchanged in SS-1, SS-2, SS-3 and LC modes (step size and loop current modes) and reflected in busy, flag, signal 3 and ring (signal 2) modes. Reflection means the return of the signaling bit from CR to CR and CD to CD of the same slot. Note that by the sequential nature of CR and CD addressing, the exchange of the delta and signaling bits requires the reversal in the time sequence of the groups of bits as well as storage of these bits for one recirculation cycle, hence the name "delta-shuffler".

Figure 11:
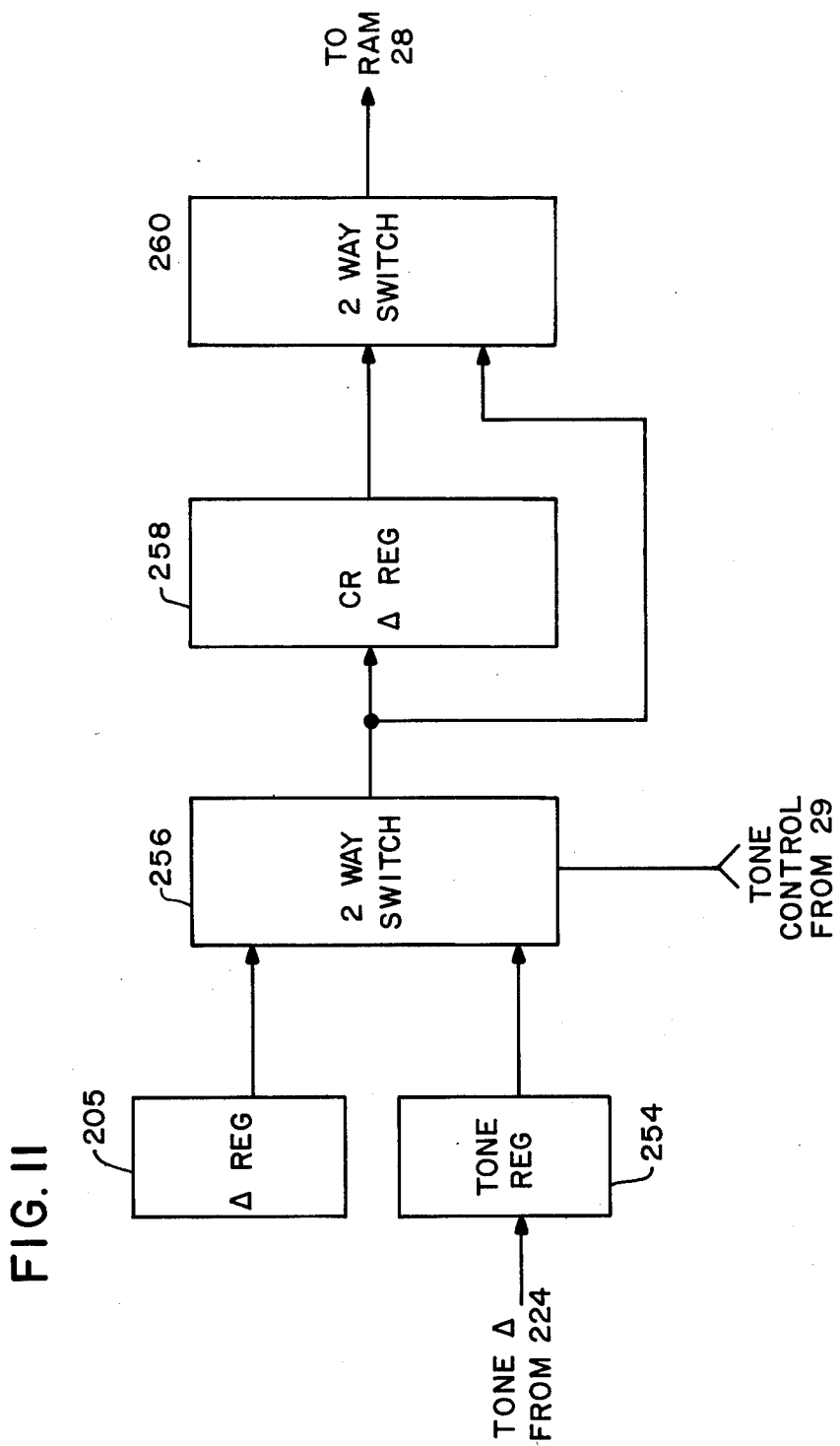
FIG. 11 is a block diagram showing the delta shuffler portion of FIG. 7 in greater detail.

FIG. 11 shows further details of the delta shuffler 223. The tone control signal from block 29 controls 2-way switch 256. Except when tone Δ bits from tone generator encoder 224 and tone register 254 are to be used, the switch 256 applies but Δ bits from block 205. Reversal of time sequence is accomplished by loading CR Δ bits into CR Δ register 258, first, then passing the CD Δ bits around register 258 through two-way switch 260 to RAM 28. Then the CR Δ register contents are passed to RAM 28 through switch 260, resulting in the CD bits being ahead of CR bits in time. In the case of reflecting CR and CD bits, this mechanism is avoided.

Figure 8:
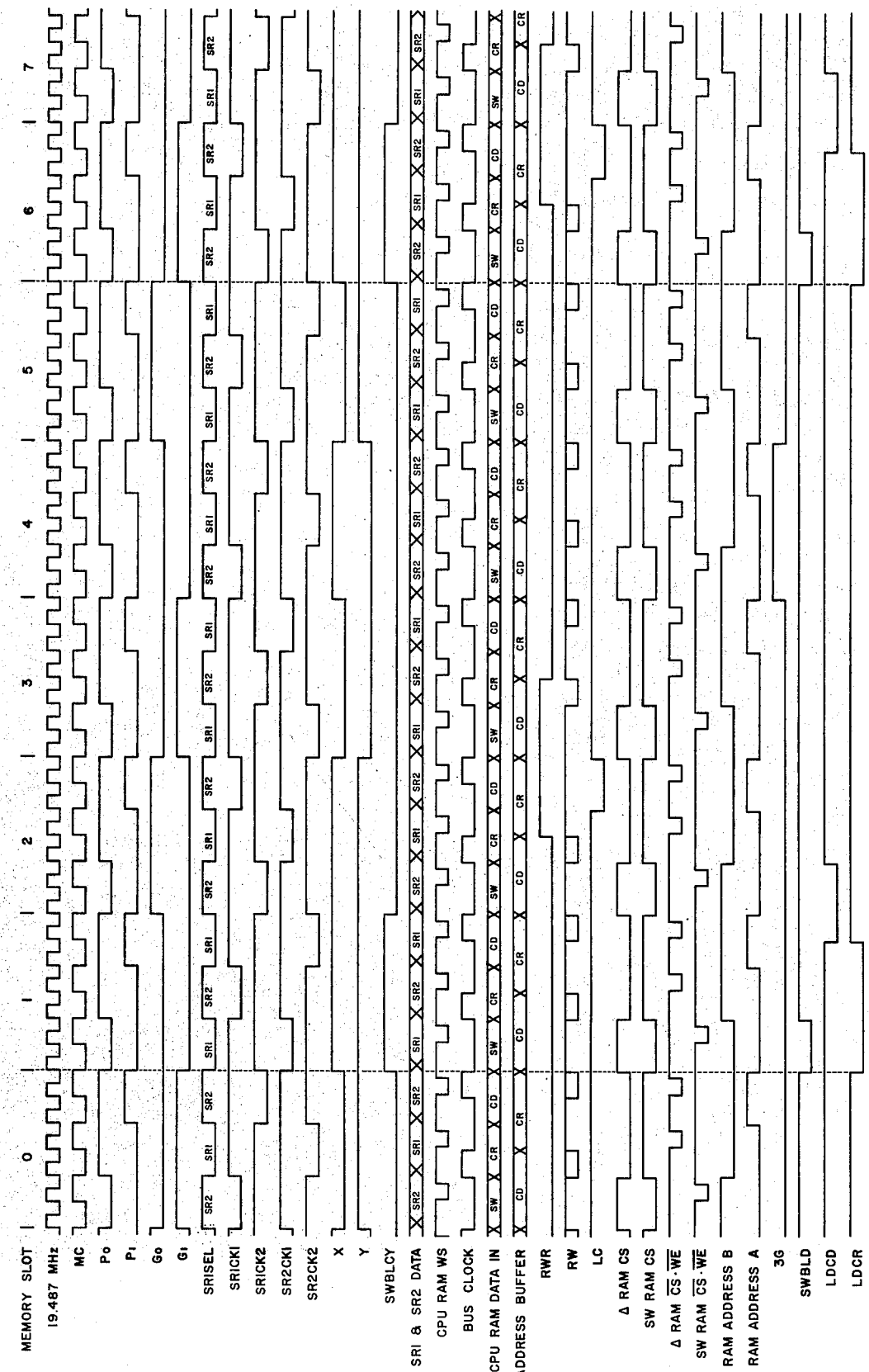
FIG. 8 is a timing diagram showing waveforms useful in understanding the system of FIG. 1.
Figure 9:
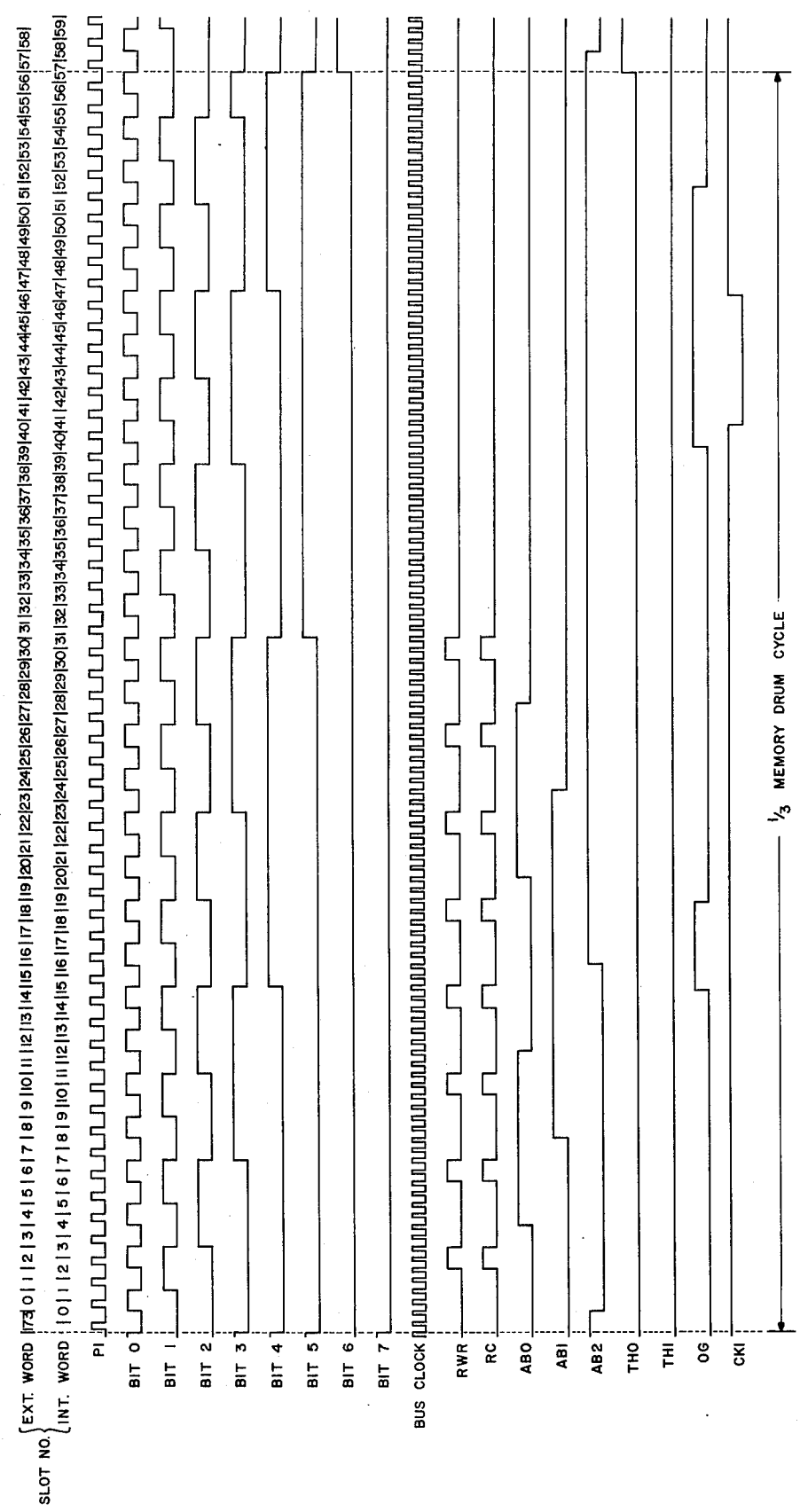
FIG. 9 is a further group of timing waveforms useful in understanding the system of FIG. 1.
Figure 10:
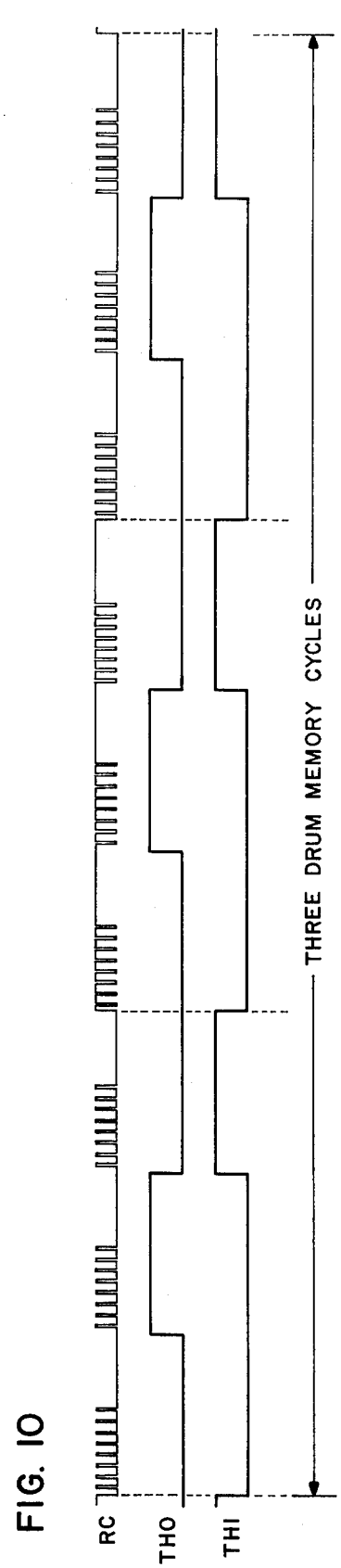
FIG. 10 is a group of timing waveforms selected from FIG. 9 and showing these waveforms over an extended time scale.

The timing signals are generated in a standard manner by the timing generator 222. The timing generator waveforms are shown in FIGS 8, 9 and 10. Referring to FIG. 8, a plurality of exemplary memory slots 0 through 7 are shown along with various timing signal waveforms. The upper waveform is a clock signal at about 19.487MHz, having a period of about 50 nanoseconds. The next waveform below is the master clock signal MC having half the frequency of the last mentioned waveform. $P_0$, $P_1$, $G_0$ and $G_1$ are derived from a counter (not shown) clocked by the master clock signal MC. $P_0$ and $P_1$ define the SW, CR and CD portions of each memory slot. $G_0$ and $G_1$ are the timing address for the 9 bit delay RAM 28 where the three slot delay is provided that is required for operation of the delta shuffler 223.

SR1 SEL denotes shift register 1 select. There are two 256 × 20 bit shift registers multiplexed together to provide the 512 ×20 bit shift register 26 shown in FIG. 7. The SR1 SEL signal alternately selects the two shift registers SR1 and SR2. Two clock phases are required for the two shift registers; these signals are shown as SR1 CK1, SR1 CK2, SR2 CK1, and SR2 CK2. As a practical matter, each shift register is run at about 5MHz, half the nominal 10MHz bit stream rate to allow the use of slow devices.

The X and Y waveforms are clock signals used to derive other clock signals to be described below.

SWBLCY denotes "status word buffer load carry" and provides for the processing of every fifth memory slot by the program circuits.

SR1 and SR2 data is not a clock signal, but is shown for convenience. It indicates the output of shift registers 1 and 2 of block 26 (FIG. 7). The "X'ed" portions indicate the indeterminate state at transitions.

CPU RAM WS denotes CPU RAM write strobe relates to 9 bit (3 slot) delay RAM (FIG. 7).

The bus clock is a re-timed clock signal occurring every 150 ns instead of the 100 ns of the master clock MC. It defines CR and CD word intervals at the CPU 2.

CPU RAM DATA INPUT shows the internal word structure of the CPU going into the 3 slot delay RAM 28 (FIG. 7) from shift register 26.

The bus clock re-times the CPU RAM DATA (i.e. CR and CD addresses) to 150 ns in the address register 206 for application to the address bus 22. The expanded CR and CD slots provide time for the delta shuffler 223 to exchange information in each direction between the CR and CD addresses.

Eight RWR pulses occur every fourth address slots at the beginning of each phase. Note the RWR slot occurring between the CR1/CD1 and CR5/CD5 slots.

The RW or write strobe pulses always occur during the last 50 ns of the RWR slot. It also can occur once or twice in an address slot if the CR or CD address bit AD11 is one. Note that the RW pulse when present corresponds to the bus clock.

LC is the latch clock for the 4-bit buffer or latch 128 in the station line unit (FIG. 3). It permits 4 bits from RAM 116 to be loaded. The LC occurs only during the first portion of the RWR slot.

ΔRAM $\overline{CS}$, the delta RAM chip select, and SW RAM $\overline{CS}$, the status word RAM chip select, are timing signals for the delta shuffler 223, and relate to bits 12-15 which carry the Δ signaling data for the CR and CD. Note their correspondence to the status word slot and the CR/CD slots of the CPU RAM DATA INPUT. They control the enabling of the delta and status word RAM's in the delta shuffler 223. The status word RAM does not exchange data, but the delta RAM exchanges data between CR and CD addresses. The Δ RAM $\overline{CS}$ . $\overline{WS}$ pulses (delta RAM chip select write strobe) occur during the CR and CD slots to control writing into the delta RAM. The SW RAM $\overline{CS}$ . $\overline{WS}$ (status word chip select write strode) controls writing into the status word RAM during the SW slot.

The Δ RAM address must be "flipped" (i.e., the CR address changed to CD address and vice-versa) in order to effect the exchange of delta information (bits 12–15) between CR and CD addresses. This is accomplished by manipulating the Δ RAM address with the Δ RAM ADDRESS B and Δ RAM ADDRESS A signals.

The 3G signal occurs every fifth slot and is used by the program circuit unit 250 portion and instruction timer 221 of the central processing unit 2 to execute the program instructions. It follows the SWBLCY signal by a time equal to the propagation delay through the program circuits.

SWBLD, status word buffer load, is derived from $P_0$ (the SW location) and SWBLCY and loads the status word into the status word register 206.

LDCD and LDCR refer to the CR and CD signaling bit as used in the program circuit unit 250.

FIG. 9 shows timing signals for a third of the memory drum cycle (FIG. 6). The top line shows the bus (external) word structure having slots divided into CR and CD sections of 150 ns each. The next line shows the memory (internal) word structure divided into SW, CR and CD sections of 100 ns each. Both show the respective slot numbers. $P_1$ is the same timing reference as shown in FIG. 8. The bit O–bit 7 waveforms show the states of a counter used for counting the slots: it counts 174/3 and repeats. The bus clock is the same as in FIG. 8. The RWR waveform shows the relation of the RWR slots to the drum cycle. The RC signal inverts in each subsequent drum cycle mode as shown in FIG. 10 for an expanded scale of 1 drum cycle, containing 3 modes: AB0, AB1, AB2 are a Gray count controlling the CODEC address. TH0 is the same as bit 6 and TH1 is the same as bit 7. The expanded scale of FIG. 10 shows TH0 and TH1 over 3 full drum cycles. OG and CK1 are used by the CODEC (FIG. 5) for the encoder slope control 166 and decoder slope control 192.

For convenience, the following table summarizes the various notations used in the specification and drawings: TABLE I. NOTATIONS USED IN SPECIFICATION AND DRAWINGS AB0, 1, 2    Codec address from timing waveform generator.

AD0–9    CR and CD address. AD0–2 address one of eight port circuits and corresponding RAM slot in each port unit; AD3–9 address a particular port unit. If port unit is addressed BS output is enabled (FIG. 3). AD0–2 also control line select which activates CS outputs (FIG. 3). AD0–2 are the same as AB0-2 during RWR slots.

AD10    Derived from OV bit (CR and CD bit 10): OV = 1 for normal conversation; OV = 0 for other. Controls transmitter gating in station line unit common circuit (FIG. 3).

BSY    Busy/idle signal from SLU multiplexed onto XS bus (FIG. 3). Idle status causes CODEC decoder to provide "1010" etc. to indicate quite line.

CD    Called word. Third of each triplet of words in each CPU memory slot (174 slots).

CK1    CODEC clock signal at 56KHz.

CR    Caller word. Second of each triplet of words in each CPU memory slot (174 slots).

CS0–9    Class of service bits. CS1–8 are manually set switches at each line circuit and are generated when the line circuit is addressed.

FLAG    General purpose tag signal. Not to be confused with flags register 215 in CPU.

Latch clock pulse; transfers bits from RAM to output side of latch (FIG. 3).

MD0, 1, 2    Signal mode control from timing waveform generator: determines what signaling information is to be transmitted or received Changes after every CPU memory cycle. Also designates step (one of eight) of program subroutine.

MD0M, MD1M, MD2M    Same as MD0, 1, 2, but buffered for program circuit.

OG    Twice clock rate CK1, for use by encoder/decoder slope controls (FIG. 5).

RC    Inverts RAM sections (FIG. 3) at end of CPU memory cycle; from timing waveform generator.

RD    Common bus for carrying delta bits serially from RAM to line circuits (FIG. 3).

RD1, 2, 3, RSB    Delta bits and signaling bits from CPU to RAM on line units (FIG. 3).

RS    Common bus for carrying signal bit to line circuits from RAM (FIG. 3).

RW    Write strobe controlled by bit 11 of CR and CD words during talk slots and by timing waveform generator 222 during RWR slots. When a port unit is addressed (AD3–9) to provide BS signal, presence of RW causes RAM (FIG. 3) to write in received bits from CPU or from port circuits. RWR pulse (from timing waveforms generator) gates those bits from CPU through recirculating gates 124 to RAM 116.

RWR    Read-write-recirculate. REfers to 1) each of 24 RWR memory slots in which each RAMs 116 exchange bits with their port circuits and 2) a timing pulse to blocks 124, 126 and 128 (FIG. 3).

SI 1, 2, 3    Signaling inputs to codec multiplexed onto XS bus (FIG. 5). In the case of a line circuit, the SI1, 2 signals control loop current and ringing status and the SI3 signal, other functions.

S0, 1, 2, 3,    Signaling outputs from codec multiplexed onto RS bus (FIG. 3). In the case of a line circuit, S0, 1, 2 control loop current and ringing and S0 3, other.

SS1, 2, 3    Step size of delta bits; multiplexed onto XS bus (FIG. 5).

SW    Status word. First of each triplet of words in each memory slot (174 slots).

TH0, 1    Three phase control signals from timing waveform generator. Controls replacement of recirculating delta and signal bits (FIG. 3) according to phases of CPU memory cycle. TH1 is also applied to codec to permit step size correction in decoder only during memory phase three.

X–0–7    Lines of bus 18 from port units to CCU. Depending on transmitter gating 118 (FIG. 3) sends CS bits plus signaling bit or certain CS bits plus 3 delta bits and signaling bit.

XD    Common bus carrying present delta bit $P_0$ from delta modulation encoder of codec that is addressed to RAM 116 (FIG. 3).

XS    Common bus carrying signal bit from line circuit to RAM 116. (FIG. 3). Updated every 3 delta bits. The particular signaling information (8 possible) to be transmitted or received is controlled by MD 0, 1, 2.

IV. PROGRAM AND PROGRAM CIRCUIT UNIT

Referring now more specifically to the program storage ROM 217. By program is meant the information stored in the program storage ROM 217, in this particular case consisting of 2,048 words each 32 bits wide. Each word is one program statement. The significance of the bits in the program statement word and the organization of the CPU are explained above. The present section will recall some of the same information from the programmer's point of view and include a sample program to illustrate the programming principles.

It will be recalled that the main CPU read/write memory consists of a 522 by 20 bit wide recirculating shift register. These words are grouped in triplets to form 174 slots, the triplet of words are known as status (SW), caller (CR) and called (CD) words, respectively. Of these 174 slots, 24 are specially marked slots called RWR slots (read-write-recirculate) required for multiplexing and demultiplexing of delta and signal bits in the port units and for "slow scan" and "search" functions to be described further below. The remaining 150 slots are "talk" or "conversation" slots used to effect conversations and to process calls. For normal conversations, one slot is used per conversation. While setting up a touch-tone 'phone call, two slots are used while dialing and for other EPABX features two or more slots may be used depending on the program.

The program register 212 is used for temporary storage of information in the CPU; for transferring information from one location of the main CPU read-write memory 24 to another and as the storage location of reference words used in CR, CD address and class of service compares. The 12 least significant bits of one of the SW, CR and CD words of any slot may be loaded into the program register 212 and the content of the program register may be inserted in the 12 least significant bits of one or more of the SW, CR and CD words circulating in the memory loop; as instructed by the program. The 10 least significant bits of the 12 bit content of the program register 212 is compared automatically with the 10 least significant bits of the CR and CD words of the slot being processed by the CPU at that instant and results recorded as COMPCR and COMPCD signals. The comparison is made during every memory cycle but the output of the comparators are sampled only every fifth cycle.

The flags register 215, which is 8 bits wide, is used as an indicator to prevent interference between instructions. For example if the program register 212 is in use by one slot of the memory it may not be used simultaneously by another slot. Such attempted double use would destroy previous information. To illustrate, if one line circuit is set busy (line circuit in use) by one calling party slot another calling party slot must not set the same line circuit busy in the same recirculation cycle, because to do so would effect a connection to the party, resulting in two calling parties connected to the same called party. This possibility is eliminated as in the following example: a slot needed to set a called party line circuit busy waits until the flags register 215 contains "FO" (hexidecimal code), which is the "idle" code used for the present programming, then it sets flags register to "BO" to inform all other slots that no other operation requiring the control of the flags register 215 can be carried out. When the CD party line circuit has been set busy, the flags register code is then set back to "FO". At this time, any other slot needing to set the same CD party line circuit busy to effect a connection would notice that the CD party is already busy and would not do so.

The flags register 215 also acts as an operation status message transfer buffer. For example, in an operation requiring two memory slots, slot "A" signals slot "B" by setting the flags register 215 to "70" ("FO"). Slot "B" waiting for this message due to the program instructions acknowledges by setting the flags register 215 to "BO", slot "A" noting this in turn sets the flags register 215 back to "FO" where it is ready for use by other slots. Note that while the control of the flags register is needed for some operations, most program steps do not need the control of the flags register 215 to be effected.

It will be recalled that the program circuit unit 250 contains the Program-storage Read-only memory 217 with 2048 (or 4096) words of 32 bits each. Each word is one program statement. The memory is addressed by 8 (or 9) of the SW bits of a slot, and the 3 'mode' bits. The output of this ROM then instructs the CPU which operation (s) are to be performed on one or more slots of the word and the condition for the execution of these operations.

A. PROGRAM STATEMENT FORMAT

1. ADDRESSING

A Program statement is addressed in the program by SW bit 19; a 4 bit 'Major Counter' (MAJC) number, consisting of SWB12 to SWB15; and a 3 bit 'Index Counter' (IX) number consisting of SWB8, 9, 10 and a 3 bit 'mode' number. Thus there are 16 × 2 MAJC numbers, each associated with 8 IX numbers, and each IX count number is associated with 8 Program statements, each statement specified by a mode number. The mode number is supplied by the CPU timing circuits, and is incremented MODULO 8 every recirculation cycle. Since the CPU processes every fifth slot, a given slot is picked up for processing only once every 5 recirculation cycles; hence if the slot sees mode number '0', the next mode number it sees is '5', and so on, the sequence being '05274163' and repeats; thus successive statements in a program routine must be placed in the address locations in the 'program-storage ROM' with the mode number sequence 05274163. For convenience in program writing, the mode numbers 01234567 labels the statement corresponding to mode numbers 05274163 respectively. An important consequence of this automatic scanning of mode numbers is that the address of the next instruction is automatically supplied unless the program continues in other MAJC numbers or IX numbers. In particular this means that a slot can wait in a program loop automatically until a process, for example timer-counting, is completed, or until a signal is received, then exit to another routine.

B. PROGRAM STATEMENT CONTENT

A program statement consists of 3 parts:
a. Condition, expressed as a combination of the presence or absence of specified signals, the satisfaction of which enables the execution of an arithmetical or logical operation on specified word or words.
b. Operation, the nature of the arithmetical or logical operation, and the word or words of the slot (SW, CR, CD) and the part of the word(s) to be modified by the operation.
c. 'Data' supplied (by the program) for the operation.

1. CONDITION

For the present program unit, a 'condition' in a program-statement must be expressible as a Boolean 'AND' or 'NAND' expression of the variables in one of the 16 groups of "Condition-variables" of Table D. There are 2 permissible ways to pick up these variables: the first is any combination of the 8 variables; the second is any combination of the bottom 4 variables and all 4 of the remaining variables or their complements. Thus we see the necessity of careful selections of variables and combination of variables in Table D. Table D is closely related to the program, and may be altered by wiring changes should future programs demand a different configuration. The 'condition' is encoded as 2 bits and 3 hexadecimal digits. The first bit, the $\overline{GO}$ bit, if '1' inverts the boolean 'AND' expression to give the 'NAND' expression. The second bit is expressed as 'N' or 'X' on the program sheet ('N' if the bit is '0' and 'X' is the bit is '1), determining the way the variables are picked, the first and second, respectively. The variables for the boolean expression are picked by a 'compare' process. The first hexadecimal digit specified 1 of 16 groups of 'condition-variables' in table C. The 2nd and 3rd hexadecimal digits are regarded as an 8 bit 'comparand'. If 'N' is specified, then where '1' is specified in the 'comparand' the variable in the corresponding bit position (from top to bottom) must be '1' for the 'compare' to be successful; this is called a "1"s compare". This compare operation in effect picks out the condition-variables specified to form a boolean 'AND' expression and gives the result of the expression for the existing 'variable-states'. For example, if the specified 'condition' is that "(the flags register bit 1 and the CR address overflow bit)" is true, or in boolean: FLG1.CROV, = 1. This is encoded as $\overline{GO}=0$, and N450. Referring to Table D the '42 group of condition-variable can be located as 50 hex. = 01010000 in binary. 'N' means "1's compare", so superimposing the comparand 01010000 on the '4' group gives the selected terms "FLG1.CROV" as required and $\overline{GO} = 0$ means no inversion is applied to the expression. If 'X' is specified, then for the bottom four variables where '1' is specified in the 'comparand' the variable in the corresponding bit position must be '1', and the remaining four variables must be '1' or '0' as specified by the corresponding bits in the comparand for the compare to be successful. This is called a 'mixed-compare' where the bottom 4 bits undergo a "1's compare" and the remaining 4 bits undergo a "full-compare". This compare operation in effect picks out the condition-variables in any combination for the bottom four variables and all four of the remaining variables, or their complements, to form a boolean 'AND' expression, and gives the result of the expression for the existing variable-states. For example, the 'condition' expressed as "$\overline{SWB7}.SWB6.\overline{SWB5}.SWB4.\overline{SWB0}$", is encoded as $\overline{GO}=0$, and "XA42". Referring to Table C group 'A' (decimal 10), '4' = 0100 specifies $\overline{SWB7}.SWB6.\overline{SWB5}.SWB4$ (by the full-compare) '2' = 0010 specified SWB0, (by "1's compare"), thus giving the required terms for the 'condition'.

While all condition-variables referred to in the program must occur in the "condition-variable table" 'D', only the combinations most often used can be listed in the 'table', because of the finite size. In cases where combinations of variables not existing in the same condition-variable group are required, more than one program-statement is used. For example, a bit in the SW, say SWB0, is preset to '1' by the first Program statement, then set to SWBO=0 by a following program statement, if the specified conditions for each statement are not met, followed by a concluding statement which executes an operation if SWBO = 1. The abbreviations and symbols used to represent "condition-variables" in Table D are defined in Table J.

2. OPERATIONS AND DATA

When the 'condition' is met, the arithmetical or logical operation executed is one of ADD, SUB, SET, CLR, INS, JMP, LFP, ILF, as defined in Table E.

Table J.

| | Definitions of Common Abbreviations |
|---|---|
| SWB 'N' = | Status Word Bit 'N' |
| CRB 'N' = | Caller Word Bit 'N' |
| CDB 'N' = | Called Word Bit 'N' |
| T = | Tag = SWB11 |
| TH0 TH1 = | 2 bits specifying the 'thirds' or 'phase' of the recirculation cycle.<br>TH1 = 0 TH0 = →1st third or phase 1<br>TH1 = 0 TH0 = 1 →2nd third or phase 2<br>TH1 = 1 TH0 = 0 →3rd third or phase 3 |
| CR INT = | Caller Interrupt Signal |

Table J.-continued

| | Definitions of Common Abbreviations |
|---|---|
| CD INT = | Called Interrupt Signal |
| Timer 1 = | CPU supplied timing signal occurs once every 32 × 40 recirculation cycle (68.57 mS) and stays '1' from mode # 0 to mode # 7. |
| Timer 2 = | CPU supplied timing signal occurs once every 512 × 40 recirculation cycle (1.097 sec) and stays '1' from mode # 0 to mode # 7. |
| FLG 'M' = | Flag Register Content Bit 'M'. |
| SIG CR = | Signal bit from caller. |
| SIG CD = | Signal bit from called. |
| COMP CR = | Content of CR match register, = 1 if CRB0→CRB9 matches program register bits 0→9. |
| COMP CD = | Content of CD match register, = 1 if CDB0→CDB9 matches program register bits 0→9. |
| COMP CS = | Output of C.S. bits comparator = 1 if C.S. bits 0→7 matches content of program register bits 0→7. C.S. bits from CR if SWB3 = 0, from CD if SWB3 = 1. |
| CS 'M' = | Class of service bit 'M'. |
| CFO = | Call Forward option bit. |
| SHATTN = | Share Attn. option bit. |
| DELUXE = | Deluxe program available bit. |
| RNA = | Ring No Answer go to Attn. option bit. |
| CONF = | Conf. Unit present bit. |
| TANDEM = | 'Tandem Trunking Allowed' bit. |

For the first 5 operations, 8 bits of data (expressed as two hexadecimal digits) supplied by the program-statement, is used for the modification of one or more of the SW, CR, CD words of the slot encountering the program-statement as specified by SW, CR, CD in the 'WHO' section. The position ("where") of the two four-bit blocks of the word or words affected is specified by M, L, TM, or TL (the mnemonic codes representing 2 bits) and defined by Tables F and G. Since the words are 20 bits long and the data supplied is only 8 bits, the convention (for the first five operations) is that where not defined by the supplied data, the modifier word is filled with zeroes. For the 'JMP' operation, in addition to the program-statement specified data, bits 16 to 18 are replaced by SWB16 to 18 in all cases. Otherwise the JMP operation is the same as 'INS':TM forces SWB19 to 1 and M (or others) force SWB19 to 0. A few examples of operation and data specification:
  a. "INS 02 MSW" means "insert '0000' in SWB 15, 14, 13, 12; '0010' in SWB 11, 10, 9, 8 respectively; and '0' in all other positions."
  b. "ADD OA LCR, CD" means (arithmetically) add "0000,0000,0000,0000,1010" to the CR and CD words" (note that for arithmetic operations the 'carry' or 'borrow' do not propagate between bits 11, 12 and bits 15, 16 by design).

For the operations LFP and ILF; Program-statement-supplied 8 bits of data is used to modify the content of the flags register 215; if in the 'where' specification it is an 'L', then the 8 bits data is loaded into the flags register 215. If 'M' is specified, then the 8 bits are 'exclusive ORed' with the content of the flags register 215. The 'Who' specification indecates which 12 L.S.B.'s of one of the words of a slot is to be loaded into the program register 212 in the case of the LFP (load flags and program-register) operation. And in the case of the 'ILF' (insert, load flags) which 12 L. S. B. 's of one or more of the words of the slot in which the contents of the program register 212 is deposited. For example:
  a. "LFP 10 LCR" means "load flags register 215 with '00010000' and the program register 212 with the 12 L. S. B. 's of the CR word of the slot."
  b. "LFP 08 M none" means "Exlusive-OR flags register 215 content with 00001000, do not load program register 212 with anything."

c. "ILF AO MCR" means "Exclusive-OR flags register 215 content with '1010.0000' and insert the content of the program register 212 in the CR word."

Simultaneously with the above mentioned operations, two other operations may be performed the "skip" operation and the "change tag" operation. If "skip" is specified, then for operations other than LFP and ILF, and if the arith/logic operation is not executed (condition not met), then the INDEX Counter (SWB8, 9, 10) is incremented by '1' by adding '1' at SWB8 position, thus causing the slot to 'skip' to the next routine or sub-routine of the program. If the arith/logic operation is 'LEP', then 'skip' occurs on execution of the operation. If the operation is 'ILF', then the 'skip' bit has a different meaning. It means set bit 11 of the deposited word (the contents of program register 212) to '1'. For CR and CD words this means if 'skip' bit is present, set WS (write strobe, = CRB11, for CR, CDB11 for CD). Note that if 'ILF' is executed, bit 10 of the word is always set to '1'; this means CROV, CDOV bits are set for CR, CD words, respectively. This bit is cleared to enable the line circuit to send the class of service bits C.S.O. to 6, and signaling bit to the CCU. These C.S. bits are used in the initial call set up where they specify line type (line, trunk, tie trunk, operator lines, tone-decoder), night answer line, and company code. Later the CROV and CDOV bits are set to '1' to enable 'Δ' and signaling bits and the C.S. 0, 9, 7, 8 class of service bits to be transmitted to the CCU. The CS bits line represents class of service code (touch tone or dial pulse) and group hunt bit. If the change-tag bit is present, then for operations other than LFP, the tag-bit (SWB11) is inverted on failure to execute an operation; for LFP operation the "change-tag" occurs on successful execution of an operation. The "change-tag" operation is used to indicate to the program routine whether or not a program statement in the routine has operated on a slot as does the OV bit on ILF operation.

C. SIGNALING BIT

The significance of a signaling bit sent by a line-circuit is determined by the mode number at the time, as shown in Table K. At different points in the system, a given signal bit arrives at different mode numbers, caused by the delays introduced by the MPLX/DMPLX scheme used. For example, a signal bit sent by a line-circuit (Codec) arrives at the CPU one mode later. The mode numbers at which given signals are sent or received at given points in the system are detailed in Table K.

Thus if 'SIG CR' is specified as a condition in a program-statement located at mode number 3, referring to Table K, this means "presence of caller (party) loop-current", or if the statement specifies the operation "Set MCD10", meaning set CD word bit 12 to '1' (signaling Δ bits are recorded in the CPU shift register memory and delayed one recirculation cycle before being sent to the line circuit's common RAM 116) and this statement is located at mode number 7, this means set CD party (addressed by the CD word) to 'busy' condition; this signaling-bit arrives at and is received by the codec (line circuit) at mode number 1, two modes later. Thus program statements sending or receiving signaling bits must be located at fixed mode numbers. A complication occurs when reading the status of a line circuit from RWR slots, as in "slow scan" (where off-hook lines requesting service are noted). During these slots there is no exchange of Δ and signaling bits between Δ RAM and CPU, causing the information to be reflected back and the shifting of mode numbers at which a given signal is to be received. For example, in reading Sig. CR from an Idle (busy-bit in line circuit, not set) line circuit in the "slow scan" routine of the program, loop current is read in mode number 4 instead of the usual mode number 3 for a conversation slot, as shown in Table K.

D. PROGRAM TIMING SIGNAL

Timing signals are needed in the program as references to measure duration of signal pulses. For example, a dial-pulse phone communicates with the CCU entirely with loop-current ('break') pulses of different periods. The Delta Modulation sample rate is 56kHz or 17.86 $\mu$s period. The recirculation cycle is 3-sample periods long, or 53.57 $\mu$s. The time taken by a slot to loop around an eight-statement loop is $5 \times 8 = 40$ recirculation cycles or 2.143 milliseconds (the factor 5 comes in because a slot is picked up for processing by the CPU only every 5 recirculation cycle). Thus if one statement in a loop increments a timer-counter, the time increments are 2.143 milliseconds, the index count loop period. The CPU timing section also provides two special timing signals for use as references by the program. 'Timer 1' is a signal that occurs once every 32 'memory cycles' and stays on from mode number 0 to 7. If monitored by a program statement at a particular mode, this gives a time-reference of 68.57 milliseconds. 'Timer 2' is a signal occurring once every 512 memory drum cycles and stays on from mode number 0 to mode number 7. If monitored by a program statement at a particular mode, this gives a time-reference period of 1.097 seconds. All the above reference periods may be effectively tripled, etc., by using 24 statement long loops, etc., which contain only one timer-counter increment statement. This works because the slot is in the 8-statements (IX count) continuing the increment counter instruction only ⅓, Table K.

| | CODEC/SYSTEM SIGNALING | | | | |
|---|---|---|---|---|---|
| MODE SEND REC. | CODEC ΔRAM | ΔRAM CPU | CPU ΔRAM | ΔRAM CODEC | MODE* |
| 111 (7) | STEP SIZE 1 | BUSY | FLAG | SIGNAL 3 | 3 |
| 000 (0) | STEP SIZE 2 | STEP SIZE 1 | BUSY | FLAG | 0 |
| 001 (1) | STEP SIZE 3 | STEP SIZE 2 | STEP SIZE 1 | BUSY | 5 |
| 010 (2) | LOOP CURRENT | STEP SIZE 3 | STEP SIZE 2 | STEP SIZE 1 | 2 |
| 011 (3) | SIGNAL 2 | LOOP CURRENT | STEP SIZE 3 | STEP SIZE 2 | 7 |
| 100 (4) | SIGNAL 3 | SIGNAL 2 | LOOP CURRENT | STEP SIZE 3 | 4 |
| 101 (5) | FLAG | SIGNAL 3 | SIGNAL 2 | LOOP CURRENT | 1 |
| 110 (6) | BUSY | FLAG | SIGNAL 3 | SIGNAL 2 | 6 | etc., fraction of the total time. Similarly, the reference periods may be effectively ¼, ⅕, etc., by including 2, 3, etc., increment statements in one IX count.

Table L

Sample Program

| P.R. ROUTINE | IX | M | MODE* | INSTRUCT. SKIP | T | SOURCE/ GO DATA | WHO/WHERE | CONDITION | CODE | CHG TAG TO | SKIP DEST. | COMMENTS |
|---|---|---|---|---|---|---|---|---|---|---|---|---|
|  | 0 | 0 | 0 SS1 | INS |  | 00 | L SW,CR,CD |  | N000 |  |  | This statement keeps the slots looping in this routine clear by unconditionally inserting '0's in all words of the slot. |
|  | 0 | 5 | 1 Sig 3 | INS |  | 02 | MSW | $\overline{TH1}$·RWR | X140 |  |  | Sends slow-scan RWR slots to slow scan routine. |
|  | 0 | 2 | 2 SS3 | INS |  | 06 | MSW | TH1·RWR | X1C0 |  |  | Sends "search" RWR slots to "search" routine (search routine not used in sample program but must be removed. |
| START (MAJC. 0) | 0 | 7 | 3 Busy | * ILF |  | E0 | MCR | Flags 10 | XF10 |  | WS | If flags code = '10' insert P.R. content in CR of idle slot with WS & CROV bits, the flag reg. content is ex-or'ed with 'E0' give 'F0' also set code to 'busy'. |
|  | 0 | 4 | 4 Sig 2 | SET |  | 00 | L NONE |  |  |  |  | No Operation |
|  | 0 | 1 | 5 SS2 | SET |  | 00 | L NONE |  |  |  |  | No Operation |
|  | 0 | 6 | 6 F | INS |  | 10 | MSW | CROV | NC08 |  |  | Sends newly started slot to request for service check routine statement '10'. |
|  | 0 | 3 | 7 LC |  |  |  |  |  |  |  |  |  |
|  | 2 | 0 | 0 | * ADD |  | 10 | LCR | $\overline{TH1}$·RWR | X140 |  | 031 | Increment CR ADD. If slow scan slot by adding '10' to address, if not slow scan slot 'skip' removes it from this routine. |
|  |  |  |  |  |  |  |  |  |  |  |  | No Operation |
|  | 2 | 5 | 1 | SET |  | 00 | L NONE |  |  |  |  |  |
|  | 2 | 2 | 2 | ADD | * | 01 | LCR | COMPCR | NF08 |  |  | If COMPCR is not present (Note GO bit), meaning the 4 LSB of the CR ADD. does not equal the RWR slot #, increment CR ADD by '1'. This proceeds until RWR slot # = 4 LSB of CR ADD. |
|  |  |  |  |  |  |  |  |  |  |  |  | No Operation |
|  | 2 | 7 | 3 | SET |  | 00 | L NONE |  |  |  |  |  |
|  | 2 | 4 | 4 LC | INS |  | 0A | MSW | SIG CR | N580 |  |  | If SIG CR is present, here is = loop current, set $\overline{T}$ (SWB11) to 1. |
| SLOW SCAN & HOUSEKEEPING (MAJC. 0) | 2 | 1 | 5 | ADD | * | 01 | LCD | COMP CD | NE08 |  |  | As 022*, except CD ADD. Least significant 4 bits is made equal to RWR slot #. Note occurance of LC Sig in mode # 4, instead of M # 3 because it is RWR slot. |
|  |  |  |  |  |  |  |  |  |  |  |  | No Operation |
|  | 2 | 6 | 6 | SET |  | 00 | L NONE |  |  |  |  |  |
|  | 2 | 3 | 7 | * INS |  | 02 | MSW | $\overline{T}$ | NE04 |  |  | If 'tag' not present, return to 020* where CR ADD is incremented. If |

Table L-continued

Sample Program

| P.R. ROUTINE | IX | M | MODE* | INSTRUCT. SKIP | T | SOURCE/ GO DATA | WHO/WHERE | CONDITION | CODE | CHG TAG TO | SKIP DEST. | COMMENTS |
|---|---|---|---|---|---|---|---|---|---|---|---|---|
| START WAIT (MAJC. 0) | 3 | 0 | 0 | SET | | 00 | L NONE | | | | | 'T' is present, i.e. attention required, 'skip' to the next routine. |
| | 3 | 5 | 1 | SET | | 00 | L NONE | | | | | No Operation |
| | 3 | 2 | 2 | SET | | 00 | L NONE | | | | | No Operation |
| | 3 | 7 | 3 | SET | | 00 | L NONE | | | | | No Operation |
| | 3 | 4 | 4 | SET * | | 00 | L NONE | | | | | "Set 00 L (None)" is a dummy instruction, i.e. = no operation. If not S.S. slot, 'skip' removes slot from routine. |
| | 3 | 1 | 5 Busy | SET | * | 00 | L NONE | RWR . T̄H̄Ī | X140 | | | No Op. If not busy (note GO bit), change 'T' to '0' if 'busy'. Note 'busy' signal occurs at mode # 1, if RWR slot reads from busy slot. |
| | 3 | 6 | 6 | LFP | * | 10 | LCR | SIG CR | N580 | | | If flags reg. free (flags = FX, 'X'=any digit) & 'T' = 1 (off hook line not busy) set flags = '10' & load P.R. with CR ADD of S.S. slot & change 'T' to '0' to indicate successful op. |
| | 3 | 3 | 7 | INS | | 02 | MSW | Flags FX . T | XCF2 | | | |
| | | | | | | | | T̄ | NE04 | | | If T=0, return S.S. slot to slow scan routine, it needs no more attention, otherwise keep on 'looping'. |
| RFS CHECK (MAJC. 1) | 0 | 0 | 0 SS1 | | | | | | | | | |
| | 0 | 5 | 1 Sig 3 | | | | | | | | | |
| | 0 | 2 | 2 SS3 | | | | | | | | | |
| | 0 | 7 | 3 Busy | SET | | 90 | TLCD | | N000 | | | Set dial tone here. |
| | 0 | 4 | 4 Sig 2 | SET | | 08 | MSW | SIG CR | N580 | | | If RFS not valid slot is sent to 'hang up' by 106 & dial tone is not heard. 'T' (SWB11) is set if CR line ckt is 'busy' (to record the busy state). |
| | 0 | 1 | 5 SS2 | SET | | 01 | LSW | SIG CR | N580 | | | SWB0 is set if CR Sig 2 = 1, i.e. if it is ringing to record the state. |
| | 0 | 6 | 6 F | INS | | 22 | MSW | SWB1 . S̄W̄B̄0̄ . T | X6CO | | | If the line ckt is 'busy' & loop current is present it is not ringing then the request for service is valid, go to DP.12 sec. wait routine. |
| | 0 | 3 | 7 LC | INS | | 77 | MSW | | N000 | | | Failing to leave the routine in the previous statement RFS is not valid. Go to 'hang up' routine. |
| | | | | SET | | 02 | LSW | SIG CR | N580 | | | Slot from 'start' routine. |

Table L-continued

Sample Program

| P.R. ROUTINE | IX | M | MODE* | INSTRUCT. SKIP | T | SOURCE/ GO DATA | WHO/WHERE | CONDITION | CODE | CHG TAG TO | SKIP DEST. | COMMENTS |
|---|---|---|---|---|---|---|---|---|---|---|---|---|
| | 2 | 0 | 0 SS1 | ADD | | 10 | LSW | Timer 2 | N204 | | | Increment the 12 sec. timer consisting of SWB4 - 7 on "Timer 2" signal, i.e. every sec. |
| | 2 | 5 | 1 SIG 3 | SET | | 00 | L NONE | | | | | No Operation |
| | 2 | 7 | 2 SS3 | SET | | 00 | L NONE | | | | | No Operation |
| | 2 | 7 | 3 Busy | SET | | 00 | L NONE | | | | | No Operation |
| | 2 | 7 | 4 SS2 | INS | SET | | 00 | $\overline{SWB7}$.SWB6 | | | | Go to 'hang up' if 12 second time limit exceeded. |
| D.P.12 SEC. No Operation (MASC. 2) | 2 | 1 | 5 SS2 | INS | 4 SIG 2 | 77 | MSW | SWB5.SWB4 | | | | |
| | 2 | 6 | 6 F | SET | | 00 | L NONE | | | | | No Operation |
| | 2 | 3 | 7 LC | INS | * | 23 | MSW | SIG CR | N580 | | | Go to D.P. accumulate routine if loop current "break" occurs. |
| | 3 | 0 | 0 SS1 | ADD | | 04 | LSW | Timer 1 | N508 | | | This statement increments the I.D. counter whenever 'timer' = 1, together with similar statements in 240, 250, causes I.D. counter to be inc. every 68.5 millisec. |
| | 3 | 5 | 1 SIG 3 | ADD | | 01 | LSW | T.SWB1.$\overline{SWB0}$ | X6C0 | | | Increment LC counter if counter reads '2' and LC=0, as indicated by T=1 counter is SWB0,1, inc. if not max & break. |
| | 3 | 2 | 2 SS3 | ADD | | 01 | LSW | T.$\overline{SWB1}$.SWB0 | X6A0 | | | Increment LC counter if counter reads '1' & LC=0, as indicated by T=1. |
| D.P. DIGIT ACCUM. (MAJC. 2) | 3 | 7 | 3 Busy | ADD | | 01 | LSW | T.$\overline{SWB1}$.SWB0 | X680 | | | Increment LC counter if counter read '0' & LC=0. 231, 232 & 233 together inc. LC counter if LC break & not max count every 6 millisec. |
| | 3 | 4 | 4 SIG 2 | SUB | | 01 | LSW | $\overline{T}$.$\overline{SWB1}$.$\overline{SWB0}$ | X620 | | | 234, 235, 236, decrements L.C. counter is count not min. & LC = make. |
| | 3 | 1 | 5 SS2 | SUB | | 01 | LSW | T.SWB1.$\overline{SWB0}$ | X640 | | | |
| | 3 | 6 | 6 F | SUB | | 01 | LSW | T.SWB1.SWB0 | X660 | | | |
| | 3 | 3 | 7 LC | INS | * | 22 | MSW | SWB17.$\overline{SWB16}$. SWB3.SWB2 | X3E0 | | | Slot is sent back to D.P.12 SEC WAIT if I.D. count=max ($\overline{SWB3}$.SWB2) & LCM=make (SWB16 & digit counter=0 (SWB17), i.e. if break=short glitch otherwise skip. |
| | 4 | 0 | 0 SS1 | ADD | | 04 | LSW | Timer 1 | N508 | | | This statement with 230, 250, inc. I.D. counter every 68.5 millisec. |
| | 4 | 5 | 1 SIG 3 | CLR | | 0C | LSW | T.$\overline{SWB16}$.SWB1. | X6E4 | | | Clears I.D. counter |

Table L-continued

Sample Program

| P.R. ROUTINE | IX | M | MODE* | INSTRUCT. SKIP | T | SOURCE/ GO DATA | WHO/WHERE | CONDITION | CODE | CHG TAG TO | SKIP DEST. | COMMENTS |
|---|---|---|---|---|---|---|---|---|---|---|---|---|
| | | | | | | | | SWB0 | | | | SWB2,3) on valid break (present LC state=break, T=1, LC monitor records 'make' SWB16=0, & LC count = max. |
| | 4 | 2 | 2 SS3 | ADD | | | 10 | LSW | | X608 | | | Increments digit counter on valid make edge, (T=0), Present LC=make, (SWB16=1) & L.C. count = min. |
| | 4 | 7 | 3 Busy | CLR | | | 1C | TLSW | T.$\overline{SWB16}$.$\overline{SWB1}$. SWB0 | X608 | | | Sets LCM=0 (SWB16=0) if valid 'make' edge. |
| | 4 | 4 | 4 SIG 2 | SET | | | 10 | TLSW | T.$\overline{SWB16}$.SWB1. SWB0 | X6E4 | | | Sets $\overline{LCM}$=1 (SWB=1) if valid 'break' edge. |
| | 4 | 1 | 5 SS2 | CLR | | | 08 | MSW | | N000 | | | Clears 'T' (SWB1) Unconditionally, such that LC break can be recorded as T=1 at 247. |
| | 4 | 6 | 6 F | ADD | | | 23 | MSW | SWB3.$\overline{SWB2}$. SWB17. $\overline{SWB16}$ | X3C0 | | Exit | Slot sent to 'digit' conversion' routine if ID count=max., deglitched loop current=make (SWB16=0) & digit count ≠ 0 (SWB17=0). |
| | 4 | 3 | 7 LC | ADD | * | | 09 | MSW | SIG CR | N580 | | | Sets T=1 if LC=break, & continue to 250, otherwise 'skip' 250. |
| | 5 | 0 | 0 SS1 | ADD | | | 04 | LSW | Timer 1 | N508 | | | This statement with 230, 240, inc. I.D. counter every 68.5 millisec. |
| | 5 | 5 | 1 SIG 3 | CLR | * | | 20 | TLSW | $\overline{SWB7}$.$\overline{SWB6}$. SWB5.SWB4 | XA00 | | | Clear SWB17 (the Digit count ≠ 0 tag) if digit count ≠ 0. |
| | 5 | 2 | 2 SS3 | SET | | | 20 | TLSW | $\overline{SWB7}$.$\overline{SWB6}$. SWB5.SWB4 | XA00 | | | Set SWB17 if digit count = 0. |
| | 5 | 7 | 3 Busy | SET | | | 40 | TLSW | SWB3.SWB2 | N3C0 | | | Set SWB18 for ID count = max. tag. |
| | 5 | 4 | 4 SIG 2 | INS | | | 77 | MSW | SWB18.SWB16 | NB50 | | Exit | Send slot to 'hang up' routine if ID count = max & break. |
| | 5 | 1 | 5 SS2 | CLR | | | 40 | TLSW | SWB18 | NB40 | | | Clear SWB18 ID count max tag. |
| | 5 | 6 | 6 F | CLR | | | 70 | TLCD | | N000 | | | Change dial tone to 'silent' tone by clearing CDB18, 17, 16. |
| | 5 | 3 | 7 LC | SUB | | | 02 | MSW | | N000 | | Exit | Returns slot unconditionally to 230. |
| | 7 | 0 | 0 SS1 | CLR | | | 30 | TDCR | | N000 | | | Clear CRB17, 16. This is done such that CRB19, 18 status can be determined by a 'mixed compare' with all 4 bits CRB19, 18 17,16. This is particular to cond. table. |

P.R. ROUTINE rows:
- D.P. DIGIT ACCUM. (MAJC.2)
- D.P. DIGIT ACCUM. (MAJC.2)
- DIGIT CONVERSION (MAJC. 4)

Table L-continued

Sample Program

| P.R. ROUTINE | IX | M | MODE* | INSTRUCT. SKIP | T | SOURCE/ GO DATA | WHO/WHERE | CONDITION | CODE | CHG TAG TO | SKIP DEST. | COMMENTS |
|---|---|---|---|---|---|---|---|---|---|---|---|---|
| | 7 | 5 | 1 SIG 3 | CLR | | F0 | LSW | SWB7 . $\overline{SWB6}$ SWB5 . SWB4 | | | | If accumulated digit is 'A' (10 pulses) a '0' digit was dialed, therefore set digit counter to '0'. |
| | 7 | 2 | 2 SS3 | SET | | 08 | MSW | $\overline{SWB7}$ . $\overline{SWB6}$ SWB5 . SWB4 | XA00 | | | Set SWB11 to '1' if digit count = 0, to indicate digit conversion complete |
| | 7 | 7 | 3 Busy | SET | | 10 | TLSW | | X080 | | | If 3rd digit set SWB16 to tag this. |
| | 7 | 4 | 4 SIG 2 | ADD | | 40 | TLCR | $\overline{CRB19}$ . $\overline{CRB18}$ CRB17 . CRB16 T | NC02 | | | Increment digit code is conversion done. |
| DIGIT CONVERSION (MAJC. 4) | 7 | 1 | 5 SS2 | INS | | 39 | MSW | T . SWB16 | NB18 | | Exit | If conversion done (T=1) & 3rd digit (SWB16=1) go to "CD Busy Check" routine, leave with T=1. |
| | 7 | 6 | 6 F | INS | | 22 | MSW | T . $\overline{SWB16}$ | N505 | | Exit | If conversion done (T=1) & not 3rd digit (SWB16 = 0) go to "D.P. 12 SEC. WAIT routine. |
| | 7 | 3 | 7 LC | ADD | | 19 | MSW | | N000 | | Cont. | Continue to the rest of the routine. |
| | 0 | 0 | 0 SS1 | SET | | 00 | L NONE | | | | | No Operation |
| | 0 | 5 | 1 SIG 3 | SET | | 00 | L NONE | | | | | No Operation |
| | 0 | 2 | 2 SS3 | INS | | 77 | MSW | T | NC02 | | Exit | If 'T'=1 at this pt. fault condition, go to 'hang up'. |
| DIGIT CONVERSION (MAJC. 5) | 0 | 7 | 3 Busy | ADD | | 64 | LCD | $\overline{CRB19}$ . CRB18 $\overline{CRB187}$ . CRB16 | X000 | | | If 1st digit, add hexadecimal 64 (=100 decimal) to CD word. Digit code determine by 'mixed compare' on CRB19,18,17, 16. |
| | 0 | 4 | 4 SIG 2 | ADD | | 0A | LCD | $\overline{CRB19}$ . $\overline{CRB18}$ CRB17 . CRB16 | X040 | | | If 2nd digit, add hexadecimal 0A (=10 decimal) to CD word. |
| | 0 | 1 | 5 SS2 | ADD | | 01 | LCD | $\overline{CRB19}$ . $\overline{CRB18}$ CRB17 . CRB16 | X080 | | | If 3rd digit add hex. 01 (=1 decimal) to CD word. |
| DIGIT CONVERSION (MAJC. 5) | 0 | 6 | 6 F | SUB | | 10 | LSW | | N000 | | | Decrement '1' from digit counter each time through the loop. |
| | 0 | 3 | 7 LC | ADD | | F7 | MSW | | N000 | | Return | Return slot to start of routine. |
| | 1 | 0 | 0 SS1 | LFP | * | B0 | L NONE | Flag FX | XCF0 | | | If flags = FX, (idle) set flags to B0, change T to 0. |
| | 1 | 5 | 1 SIG 3 | CLR | | 04 | MCR, CD | | N000 | | | preclear CROV & CDOV |
| CD BUSY CHECK (MAJC. 3) | 1 | 2 | 2 SS3 | SET | | 1C | MCD | SWB16 . $\overline{T}$ . $\overline{SIG\ CD}$ | N516 | | | If CDLC=0 (SW16=0) & slot in control of flags (T=0) & CD line ckt not 'busy', set CD to 'busy' & give CDWS & tag this by setting CDOV=1. |
| | 1 | 7 | 3 Busy | | | | | | | | | |

Table L-continued
Sample Program

| P.R. ROUTINE | IX | M | MODE* | INSTRUCT. SKIP | T | SOURCE/ GO DATA | WHO/WHERE | CONDITION | CODE | CHG TAG TO | SKIP DEST. | COMMENTS |
|---|---|---|---|---|---|---|---|---|---|---|---|---|
|  | 1 | 4 | 4 SIG 2 | LFP |  | F0 | L NONE | $\bar{T}$ | N502 |  |  | Clear flags = F0 if busy check done. |
|  | 1 | 1 | 5 SS2 | INS |  | 32 | MSW | $\bar{T}$ . CDOV . $\overline{CROV}$ | X210 |  | Exit | Go to 'ringing' routine if CD available. |
|  | 1 | 6 | 6 | INS |  | 74 | MSW | $\bar{T}$ |  |  |  | Entry pt. of slot from digit conv. Note T=1 on entry. Go to 'busy' routine if CD busy. |
|  | 1 | 3 | 7 LC | SET |  | 10 | TLSW | SIG CD | N540 |  |  | If CD is off-hook, i.e., LC=1, set SWB16 to '1' to tag this. |
|  | 2 | 0 | 0 SS1 | SET |  | 04 | MCR CD |  | N000 |  |  | Set CROV & CDOV. |
|  | 2 | 5 | 1 SIG 3 | SET |  | 00 | L NONE |  |  |  |  | No Operation |
|  | 2 | 2 | 2 SS3 | ADD |  | 10 | TLSW |  | N204 |  |  | Increment ring cycle counter every sec. |
| RINGING (MAJC. 3) | 2 | 7 | 3 Busy | ADD |  | 01 | MSW | SWB19 . $\overline{SWB18}$ | N000 |  | Cont. | Continue routine at 334. |
|  | 2 | 4 | 4 SIG 2 | CLR |  | 10 | MCD | $\overline{SWB17}$ . $\overline{SWB16}$ | XB10 |  |  | Clear CD SIG 2 if 'ring count' ≠ 1. |
|  | 2 | 1 | 5 SS2 | CLR |  | F0 | TLCD | $\overline{SWB19}$ . SWB18 | XB10 |  |  | Clear CR ring back tone if ring count ≠ 1. |
|  | 2 | 6 | 6 F | CLR |  | C0 | TLSW |  | N000 |  |  | Clear SWB19, 18 unconditionally, because we use SWB16, 17 to record the ringing cycle & we can read SWB19, 18 together with SWB16, 17 only in a 'mixed compare'. |
|  | 2 | 3 | 7 LC | INS | * | 77 | MSW | SIG CR | N580 |  | Exit | If CR LC=0, send slot to 'hang up' routine. |
|  | 3 | 0 | 0 SS1 | SET |  | F0 | TLCD | SWB0 | N308 |  |  | CLR tone bits if CD party answers (SWB0=1) to allow exchange of delta. |
| RINGING (MAJC. 3) | 3 | 5 | 1 SIG 3 | INS |  | 34 | MSW | SWB0 | N308 |  | Exit | Go to 'Conversation' routine when CD answers. |
|  | 3 | 2 | 2 SS3 | ADD |  | 10 | TLSW | Timer 2 | N204 |  |  | Increment 'ring cycle' every sec. |
|  | 3 | 7 | 3 Busy | SUB |  | 01 | MSW | $\overline{SWB19}$ . SWB18 | N000 |  | Cont. | Continue routine at 324. |
|  | 3 | 4 | 4 SIG 2 | SET |  | 10 | MCD | $\overline{SWB17}$ . $\overline{SWB16}$ | XB10 |  |  | Set CD SIG 2 = 1 if 'ring count' = 1. |
|  | 3 | 1 | 5 SS2 | SET |  | B0 | TLCD | SWB19 . SWB18 | XB10 |  |  | Set tone bits (CDB16,17, 18,19) to ring-back tone for CR. If 'ring count' =1. |
|  | 3 | 6 | 6 F | SET |  | 00 | L NONE |  |  |  |  | No Operation |
|  | 3 | 3 | 7 LC | SET |  | 01 | LSW | SIG CD | N540 |  |  | Set SWB0=1 to tag CD LC=1. (CD party answers). |
|  | 4 | 0 | 0 SS1 | CLR |  | E0 | TLSW | SWB16 | N504 |  |  | If CRLC=1 & CDLC=1 then SWB16=1, reset LC break timer. |
|  | 4 | 5 | 1 SIG 3 | CLR |  | 10 | MCR,CD |  | N000 |  |  | Clear SIG 3 unconditionally. |
| CONVERSATION (MAJC. 3) | 4 | 2 | 2 SS3 | ADD |  | 20 | TLSW | $\overline{SWB16}$ . Timer 1 | N60C |  |  | Increment LC break timer. If CRLC or CDLC 'break' & on timer 1 signal, i.e. |

Table L-continued

Sample Program

| P.R. ROUTINE | IX | M | MODE* | INSTRUCT. SKIP | T | SOURCE/ GO | DATA | WHO/WHERE | CONDITION | CODE | CHG TAG TO | SKIP DEST. | COMMENTS |
|---|---|---|---|---|---|---|---|---|---|---|---|---|---|
| | 4 | 7 | 3 Busy | SET | | | 10 | MCR, CD | | N000 | | | every 68.5 millisec. Set 'Busy' Sig to CR, CD unconditionally. (Line ckt should be 'busy' when in conversation.) |
| | 4 | 4 | 4 SIG 2 | CLR | | | 10 | MCR,CD | | N000 | | | Clear CR,CD SIG 2, unconditionally (line ckt should not 'ring' in conversation). |
| | 4 | 1 | 5 SS2 | INS | | | 77 | MSW | $\overline{SWB19} \cdot \overline{SWB18}$. SWB17. SWB16 | XB60 | | | If L.C. counter = max. go to 'hang up'. |
| CONVERSATION (MAJC. 3) | 4 | 6 | 6 F | SET | | | 10 | TLSW | | N000 | | | Set SWB16 unconditionally next statement clear SWB16 if CR or CD LC breaks. |
| | 4 | 3 | 7 LC | CLR | | * | 10 | TLSW | SIG CR . SIG CD | N5C0 | | | CLR SWB16 if CR or CD loop current 'breaks'. |
| | 4 | 0 | 0 SS1 | ADD | | | 01 | LSW | Timer 1 | N508 | | | Increment busy cycle timer. |
| | 4 | 5 | 1 SIG 3 | CLR | | * | 70 | TLCD | SWB2 | N340 | | | Give silent tone for 274 millisec. |
| | 4 | 2 | 2 SS3 | SET | | | 30 | TL CD | SWB2 | N340 | | | Give 'Busy' tone for 274 millisec. |
| BUSY (MAJC. 7) | 4 | 7 | 3 Busy | CLR | | | 08 | LSW | | N000 | | | Clear SWB3 to prevent overflow of busy cycle timer. |
| | 4 | 4 | 4 SIG 2 | SET | | | 00 | L NONE | | | | | No Operation |
| | 4 | 1 | 5 SS2 | ADD | | | 10 | LSW | Timer 1 | N508 | | | Inc. LC timer every 68.5 millisec. |
| | 4 | 6 | 6 F | INS | | | 77 | MSW | $\overline{SWB7}$ . $\overline{SWB6}$. SWB5=1,SWB4 | XA30 | | | If LC break 200 millisec (SWB5=1,SWB4=1) go to 'hang up' routine. |
| | 4 | 3 | 7 LC | CLR | | | F0 | LSW | SIG CR | N580 | | | Clear LC Timer SWB7,6,5, if LC=1. |
| | 7 | 0 | 0 SS1 | SET | | | 00 | L NONE | | | | | No operation |
| | 7 | 5 | 1 SIG 3 | CLR | | | 10 | MCR,CD | | N000 | | | Clear SIG 3 unconditionally (CR & CD) |
| | 7 | 2 | 2 SS3 | SET | | | 00 | L NONE | | | | | No Operation |
| | 7 | 7 | 3 Busy | CLR | | | 10 | MCR,CD | SWB1 | N640 | | | Clear CR,CD Busy if slot has looped around routine. |
| HANG UP (MAJC. 7) | 7 | 4 | 4 SIG 2 | CLR | | | 10 | MCR,CD | | N000 | | | Clear CR,CD SIG 2 unconditionally. |
| | 7 | 1 | 5 SS2 | INS | | | 00 | L SW, CR,CD | SWB1 | N640 | | | Clear SW,CR,CD words if slot has looped around routine. |
| | 7 | 6 | 6 F | CLR | | | 10 | MCR,CD | | NA20 | | | Clear 'F' unconditionally (CR & CD). |
| | 7 | 3 | 7 LC | ADD | | | 01 | LSW | | N000 | | | Inc. loop counter by adding 1 at SWB0. |

E. SAMPLE PROGRAM

A sample program, Table L, is written to illustrate programming techniques. Briefly, the sample program shows how the off-hook conduit on of a phone is picked up, checked for status, if not in conversation (busy), or faulty line, assigned a slot in the shift reg. recirculating memory, and given dial tone. Then the dial pulses from the phone are deglitched and accumulated as dialed digits in BCD code. The DCD coded digits are converted to binary equivalent values and accumulated in the CD word, one at a time, resulting finally in a 10-bit binary address equivalent of the 3 dialed digits. The CD party specified by the address is then checked for availability, i.e., not 'busy'. If available, CD phone is set to ring. CR phone gets ring-back tone. When CD party answers, the ringing and ring-back tone are stopped and CR talks to CD. When either party hangs up during conversation, or if CR hangs up during ringing, both line circuits are set to non-busy condition, and then the slot is cleared. The above describes a basic telephone service program without any extra PABX features; consequently, a number of the condition variables shown in table D are not needed. The sample program is written on standard programming sheets, and the following explanation of the program routine and statements must be read with reference to the program sheets.

1. Slow-scan, housekeeping: This routine uses RWR slots 0 to 15 to examine the status of each line in the system in succession, each of the RWR slots examining 1/16 of all the addresses of the system. The 'Housekeeping' program statements keep the RWR slots labelled correctly. The routine is located at 020* to 027*. (020* denotes real mode 020; 027* denotes 203, etc.) Note mode number shift for RWR slot reading from idle line circuit: LC occurs at mode number 4 instead of mode number 3.

2. Start Wait: This routine takes the slow-scan slot that found a line requiring attention and holds in the routine until the flags register 215 and therefore the program register 212 is free. Then the line-address, which is the CR address of the slow-scan slot, is loaded into the program register 212, and the flags register 215 set to '10' which is the "start new slot with content of program register 212 as CR address" code; the 'START' routine notes this and starts the new slot. Note mode number shift for RWR slot reading from 'Busy' line circuit: 'Busy' signal occurs at mode number 1 instead of mode number 7, if read from a conversation slot. All other signals are similarly shifted by 2 modes for this case of RWR slot reading from a 'busy' line circuit.

3. 'Start' Routine IDLE slots (slots with '0' s in all the words) are assigned to line requesting service in this routine. When the flags register 215 contains Code '10' this routine inserts the content of the program register 212 in the CR word of an idle slot and sets the flags register to 'Idle-Code' 'FX' ('X' = any digit), in this case 'F0', and makes the caller busy.

4. Request for Service Check Routine: The newly started slot arrives from the 'start' routine and is checked to see if the CR line circuit Sig 2 = 0 (not ringing), L.C. = 1 (loop current is present), and B = 1 (the line circuit is set to 'busy' state). If so, the request for service is valid and the slot is sent to the dialing routine "Dial Pulse 12 sec. wait" with "dial tone" set; otherwise the slot is sent to the "hang-up" routine.

5. Dial Pulse 12 sec. wait routine: This routine is where the slot waits (by looping in the routine) for dial-pulses from the line associated with the slot which requested service. 12 seconds are allowed for each digit dialed. This time limit is provided such that a 'lock out' feature may be incorporated in the completed program. (For simplicity, the sample program does not have 'lock out'.) The slot is sent to the "hang-up" routine if the time limit is exceeded. On any break in loop cirrent D.P. or hook switch, the slot is sent to the Dial Pulse Accumulation Routine.

6. Dial Pulse Digit Accumulation Routine: The slot enters this routine from the "Dial Pulse 12 sec. wait" routine on loop current break. This routine is 24 statements long; it deglitches the loop current signal by the use of a loop current counter consisting of SWB0, 1., L.C. state tag SWB11, and an $\overline{L.C.}$ monitor (L.C.M.) bit SWB16 which records the past deglitched L.C. state. For example, in the case of a transition from 'make' to 'break', the slot enters the routine with SWB0, 1, = 0 i.e., L.C. counter = min. representing the maximum 'make' time. L.C. break and make, respectively, causes increment or decrement of this L.C. counter. When the L.C. counter is maximum and the LCM = 0 (indicating a former state of make) and T = 1 (present L.C. = 0), the breakage is considered valid, and LCM is set to 1' to record a 'break'. Similarly, the L.C. make edge is considered valid if the L.C. Counter reached minimum, LCM = 1 (former LC state-break) and T = 0 (present loop current state = make). Thus an oscillating make/break due to contact bounce is averaged out digitally to give the true state. A valid make edge is considered a valid dial-pulse, and it causes the Digit Counter consisting of SWB 4,5,6,7 to be incremented by '1'. Another counter, the Interdigital Counter (I.D. Counter), consists of SWB2,3 and is incremented by '1' once every 68.57 milliseconds and reset to '0' at every valid 'make' or 'break' edge. The I.D. Counter is used to monitor the time since the last transition. If the break period is too long, it is considered a 'hang-up' and the slot is sent to the 'hang-up' routine. If the 'make' period is greater than the maximum interdigital pause period and the digit counter did not record any dial pulses, the break which sent the slot here is too short for a dial pulse and is considered a 'glitch' and the slot is sent back to the "Dial Pulse 12 sec. wait" routine. If the make period is greater than the maximum 'interdigital pause' period and the Digit Counter is not zero, then a valid dialed number has been received and the slot is sent to the "Digit Conversion" routine where the dialed number is converted to its equivalent in binary and added to the CD word to form the CD address.

7. Digit Conversion Routine: This routine takes the accumulated digit 'N' in the digit counter (SWB7,6,5,4) and translates it to $N \times 10^2$, $N \times 10$, N, respectively, if the digit is the 1st, 2nd, or 3rd dialed, and adds this number expressed in binary to the CD word of the slot, then sends the slot to 'D.P. 12 sec. wait' routine if it is the 1st and 2nd digits, and to 'CD Busy Check' routine if it is the 3rd digit. CRB19, CRB18 are used to indicate what digit it is, i.e., 00 = 1st, 01 = 2nd, 10 = 3rd digit codes, and the digit code is incremented by '1' before return to the "Dial Pulse 12 sec. wait" routine. For example, if '2,3,4' is the dialed number, the first digit dialed is '2'; thus '200' is added to the CD word by adding '100' and decrementing the digit counter until digit count = 0, in this case twice, then the digit code is incremented to '01' and the slot returned to "Dial Pulse 12 sec. wait" routine. Similarly, 30 and 4 are added for the 2nd and 3rd dialed digit, resulting in the binary number equivalent of 234 in the CD word (for the CD address). On the 3rd digit when the conversation is complete the slot is sent to the "CD Busy Check" routine.

8. CD Busy Check Routine: This routine receives a slot with CR and CD addresses, and has to check and see if 'CD' is busy; if so, the slot is sent to the 'Busy' routine; otherwise CD line circuit is sent to 'busy' and sent to the "Ringing" routine. Note the setting of a line circuit to 'Busy' is done only when the slot has control over the flags; this rule prevents the same party being set 'busy' and conversation initiated with 2 (or more) slots simultaneously by coincidence. Program statement 313 of this routine needs some explanation. We want to set CDOV=1, for CD available and set to 'busy' tag, and CDB12-1 for setting the Sig CD to 1, to set the line circuit to 'busy' state, CDB11-1 to allow the issue of write strobe this must be done in mode * number 3, and we must also record that we have done so at the same time. This is done by setting CDB12, CDB11 and CDB10 simultaneously to '1'.

9. Ringing Routine: This routine sets and clears CD Sig 2 signal which operates the ringing delay at the CD line circuit to produce ringing at the CD phone. Ringback tone and silient-tone is returned to the CR party in synchronism with the ring and silient periods respectively. CR and CD loop currents are monitored. If CR hangs up (CRLC=0) the slot is sent to the "hang-up" routine. If CD off-hooks (LC = 1) the slot is sent to the conversation routine.

10. Conversation Routine: This routine monitors the loop current of CR and CD. If either LC = 0 for about 200 milliseconds the routine sends the slot to "hang-up" routine. This routine also keeps setting 'busy' and clearing, Sig 2, Sig 3, of CR and CD, to prevent transients, if any, from clearing the 'Busy' and setting the other signals.

11. Busy Routine: This routine provides the 'busy' tone, and monitors CR loop current. If CRLC = 0, it sends the slot to 'hang-up' routine.

12. Hang-Up Routine: Any slot sent to this routine has the CR and CD line circuit signaling states ('F' bit, Sig 2, Sig3) all set to '0', i.e., busy. Then the SW, CR, CD words of the slot are all set to '0'; i.e., cleared. Note that the 'cleared' slot having the MAJC = 0, IX = 0 automatically goes to the 'Start' routine where it 'loops' until assigned to a line by the routine.

Other programs to suit specific functions are well within the skill of the ordinary programmer, in view of the teachings herein.

While the invention has been described in connection with a preferred embodiment comprising an electronic private automatic branch exchange telephone system, various modifications and alternatives will be apparent to those or ordinary skill in the art. The invention is thus to be limited only by the scope of the appended claims.

We claim:

1. In a telephone system, digital time-multiplex programmable switching apparatus for establishing on demand, time shared connections between pairs of ports comprising a plurality of port means, each of said port means having a unique address, said port means including means for generating predetermined digital signaling signals in response to particular conditions at said port means and said port means further including means for generating digital information signals in response to an applied information signal, central processor unit means including memory means having a plurality of recirculating slots including slots for storing pairs of port means addresses and information signals directed to said addresses and means responsive to said signaling signals for inserting in said memory means slots pairs of port means addresses to establish time-multiplex information exchanging connections between said pairs of port means and means responsive to the sequential occurrence of port means addresses in said memory means slots for simultaneously sending digital information stored with each of said port means addresses in said memory means slots to said addressed port means and for receiving digital information from said addressed port means, and common bus means interconnecting all of said plurality of port means and said central processor means.

2. The combination of claim 1 wherein said received digital information from said addressed port means is applied to shuffler means for storing said digital information until the next occurrence of the memory means slot storing that pair of port means addresses which includes the address of the port means from which said digital information was received and for inserting said stored digital information into said memory means slot with the other of said pair of port means addresses, whereby digital information received from one of the pairs of port means whose addresses are in a particular memory means slot is sent to the other of the pairs of port means at the next occurrence of that time slot.

3. The combination of claim 2 further comprising means in said central processor unit means for controlling the content of said memory means slots in response to signaling signals received from said port means.

4. The combination of claim 3 wherein said means for inserting, further inserts a status derived from said port means signaling signals.

5. The combination of claim 4 wherein said means for controlling the content of said memory means slots is further responsive to said status signal stored in said memory means slots.

6. The combination of claim 5 wherein said means for controlling said memory means slots includes a predetermined program circuit means and said status signal defines a subroutine of a predetermined program.

7. The combination of claim 6 wherein each of said memory means slots comprises a triplet of digital words, each of said triplets including a status word containing said status signal a caller word and a called word, said caller and called words indicating the respective digital addresses of caller and called port means and storing digital information directed to respective port means.

8. In a telephone system, digital time-multiplex programmable switching apparatus for establishing on demand, time shared connections between pairs of ports comprising a plurality of port means, each of said port means comprising one or more port circuit means having a common buffer memory means, each of said port circuit means having a unique address, said port circuit means including means for generating predetermined digital signaling signals in response to particular condition at said port circuit means and said port circuit means further including means for generating digital information signals when an information input signal is applied, central processor unit means including memory means having a plurality of recirculating slots and means for inserting in said memory means slots pairs of port circuit means addresses and information signals directed to said addresses in response to said signaling signals from said port circuit means to establish time-multiplex information exchanging connections between said pairs of port circuit means, and common bus means interconnecting all of said plurality of port means and said central processor means.

9. The combination of claim 8 wherein said buffer memory means receives and transmits data at a first rate and first level of time multiplexing with said central processor unit means and receives and transmits data at a second rate and second level of time multiplexing with said port circuit means.

10. The combination of claim 9 wherein said data path between said buffer memory means and said central processor unit means is parallel and the data path between said buffer memory means and said port circuit means is serial.

11. The combination of claim 8 wherein said means for generating digital information signals when an information input signal is applied is responsive to analog signals and wherein said means further functions to generate analog signals in response to digital information signals.

12. The combination of claim 11 wherein said means for generating digital information signals in response to analog signals and for generating analog signals in response to digital information signals comprises a companded delta modulation coder/decoder.

13. In a telephone system, digital time-multiplex programmable switching apparatus for establishing on demand, time shared connections between pairs of ports comprising a plurality of port means, each of said port means comprising one or more port circuit means having a common buffer memory means, each of said port circuit means having a unique address, said port circuit means including means for generating predetermined digital signaling signals in response to particular conditions at said port circuit means and said port circuit means further including means for generating digital information signals when an information input signal is applied, central processor unit means including memory means having a plurality of recirculating slots and means for inserting in said memory means slots pairs of port circuit means addresses and information signals directed to said addresses in response to said signaling signals from said port circuit means to establish time-multiplex information exchanging connections between said pairs of port circuit means and means for controlling the content of said memory means slots in response to signaling signals received from said port circuit means, and common bus means interconnecting all of said plurality of port means and said central processor means.

14. The combination of claim 13 wherein said buffer memory means receives and transmits data at a first rate and first level of time multiplexing with said central processor unit means and receives and transmits data at a second rate and second level of time multiplexing with said port circuit means.

15. In a telephone system, digital time-multiplex programmable switching apparatus for establishing on demand, time shared connections between pairs of ports comprising a plurality of port means, each of said port means comprising one or more port circuit means having a common buffer memory means, each of said port circuit means having a unique address, said port means including means for generating predetermined digital signaling signals in response to particular conditions at said port circuit means and said port circuit means further including means for generating digital information signals when an information input signal is applied, central processor unit means including memory means having a plurality of recirculating slots and means for inserting in said memory means slots pairs of port circuit means addresses and information signals directed to said addresses and status signals in response to said signaling signals from said port circuit means to establish time-multiplex information exchanging connections between said pairs of port circuit means and means for controlling the content of said memory means slots in response to signaling signals received from said port circuit means, and to status signals stored in said memory means slots and to predetermined program circuit means, wherein a status signal defines a subroutine of a predetermined program, and common bus means interconnecting all of said plurality of port means and said central processor means.

16. The combination of claim 15 wherein said buffer memory means receives and transmits data at a first rate and first level of time multiplexing with said central processor unit means and receives and transmits data a second rate and second level of time multiplexing with said port circuit means.

* * * * *

UNITED STATES PATENT OFFICE
CERTIFICATE OF CORRECTION

Patent No. 4,061,880          Dated December 6, 1977

Inventor(s) Galen R. Collins, George A. May, Indra Lee Gendo

It is certified that error appears in the above-identified patent and that said Letters Patent are hereby corrected as shown below:

Col. 2, line 54, "as" should be --a--.

Col. 10, line 64, after "updating" --delta-- should be inserted.

Col. 12, line 18, "46" should be --146--.

Col. 22, Table D, col. 6, "Spare" should be moved to col. 7 and --1-- substituted; "1" now in col. 7 under "Tandem" should be moved to far right column under "1".

Col. 31, line 53, before "Latch" --LC-- should be inserted.

Col. 43, Table L-continued, Sample Program, under col. "P.R. Routine" there appears to be an overprint; it should read --D.P.12 SEC. WAIT (MASJ. 2)--; in col. "M", fifth digit down, "7" should be --4--; in col. "MODE*" line 5, "4" should be deleted and --4SIG2-- should be substituted, and deleted from between the columns; in col. "INSTRUCT.", line 5, --SET-- should be inserted, and deleted from between the columns; in column "DATA", line 5, --00-- should be inserted; column "WHO/WHERE", line 5, "00" should be deleted, and --L NONE-- inserted therein; column "CONDITION", line 5, "L NONE" should be deleted; column "COMMENTS", line 8 --No Operation-- should be inserted.

UNITED STATES PATENT OFFICE
CERTIFICATE OF CORRECTION

Patent No. 4,061,880　　　　　　　　Dated December 6, 1977

Inventor(s) Galen R. Collins, George A. May, Indra Lee Gendo

It is certified that error appears in the above-identified patent and that said Letters Patent are hereby corrected as shown below:

Claim 4, line 39, --signal-- should be inserted after "status".

Claim 7, line 52, a comma should be inserted after "signal"; line 55, insert --the-- after "to".

Claim 8, line 67, "condition" should be plural.

Claim 10, line 20, delete "said" and substitute --the--.

Signed and Sealed this

*Seventh* Day of *November 1978*

[SEAL]

*Attest:*

RUTH C. MASON
*Attesting Officer*

DONALD W. BANNER
*Commissioner of Patents and Trademarks*